US006947802B2

(12) United States Patent
Picard et al.

(10) Patent No.: US 6,947,802 B2
(45) Date of Patent: Sep. 20, 2005

(54) CENTRALIZED CONTROL ARCHITECTURE FOR A LASER MATERIALS PROCESSING SYSTEM

(75) Inventors: Tate S. Picard, Enfield, NH (US); Kenneth J. Woods, Lebanon, NH (US); Roger E. Young, Jr., Canaan, NH (US); William J. Connally, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 43 days.

(21) Appl. No.: 10/403,688

(22) Filed: Mar. 31, 2003

(65) Prior Publication Data

US 2003/0204283 A1 Oct. 30, 2003

Related U.S. Application Data

(63) Continuation-in-part of application No. 09/546,155, filed on Apr. 10, 2000, now Pat. No. 6,622,058.

(51) Int. Cl.[7] .............................................. G06F 19/00
(52) U.S. Cl. .................. 700/117; 700/170; 219/121.39
(58) Field of Search ................................. 700/117, 108, 700/174, 160, 170; 219/121.55, 121.39, 121.49

(56) References Cited

U.S. PATENT DOCUMENTS

| 3,795,918 A | 3/1974 | Sunderland | 356/45 |
|---|---|---|---|
| 3,866,484 A | 2/1975 | Dreshman | 74/422 |
| 3,912,242 A | 10/1975 | Schoffmann | 266/23 K |

(Continued)

FOREIGN PATENT DOCUMENTS

| DE | 0 2 203 194 | 4/1973 |
|---|---|---|
| EP | 0 370 967 B1 | 5/1990 |
| EP | 0 370 967 A1 | 5/1990 |
| EP | 0 437 226 B1 | 7/1991 |
| EP | 0 437 226 A2 | 7/1991 |
| EP | 0 437 226 A3 | 7/1991 |
| EP | 1161126 A2 | 12/2001 |
| WO | WO 00/41837 | 7/2000 |
| WO | WO 03/041903 | 5/2003 |

OTHER PUBLICATIONS

Communication Relating to the Results of the Partial International Search for International Patent Application No. PCT/US2004/009932, date of mailing Sep. 21, 2004, 10 pages.

Rogozinski, M.W. et al., "Development of a 'Smart' Plasma Arc Cutting System" Electrical Engineering Congress, Nov. 24–30, 1994.

Haferkamp, H. et al. "Quality Monitoring and Assurance for Laser Beam Cutting Using a Thermographic Process Control" *SPIE* vol. 3824 (Jun. 1999).

Miyamoto, I. et al., "Fundamental Study of In–Process Monitoring in Laser Cutting" 4th International Colloquium on Welding and Melting By Electronics and Laser Beam, Sep. 26–30, 1988.

Olsen, F.O. "Investigations in Methods for Adaptive Control of Laser Processing" *Opto Electronic Magazine* vol. 4, No. 2. (1988).

Zheng, H. Y., "The Use of Fibre Optics for In–Process Monitoring of Laser Cutting" *ICALEO* vol. 69 (1989).

*Primary Examiner*—Kidest Bahta
(74) *Attorney, Agent, or Firm*—Proskauer Rose LLP

(57) ABSTRACT

Apparatus, systems, and methods for monitoring the processing of a workpiece that includes directing an incident laser beam onto the workpiece and using an optical detector for measuring a signal emitted from the workpiece as a result of the incident laser beam. The detector generates at least two signals based upon the optical signal. The method also involves use of a light source monitor in determining workpiece processing quality based upon the quotient of the two outputs as well as a magnitude of one of the two quotients.

42 Claims, 31 Drawing Sheets

U.S. PATENT DOCUMENTS

| | | | |
|---|---|---|---|
| 3,918,480 A | 11/1975 | Leo | 137/488 |
| 3,929,324 A | 12/1975 | Lotz et al. | 266/23 K |
| 4,003,556 A | 1/1977 | Roeder | 266/48 |
| 4,081,215 A | 3/1978 | Penney et al. | 356/45 |
| 4,101,754 A | 7/1978 | Fischer | 219/121 |
| 4,111,404 A | 9/1978 | Benko | 266/58 |
| 4,125,250 A | 11/1978 | Herbener et al. | 266/50 |
| 4,133,988 A | 1/1979 | Esibyan et al. | 219/121 |
| 4,143,929 A | 3/1979 | Boje et al. | 339/5 M |
| 4,156,125 A | 5/1979 | Brown | 219/124.02 |
| 4,170,727 A | 10/1979 | Wilkins | 219/121 |
| 4,172,586 A | 10/1979 | Schmitt | 266/48 |
| 4,172,587 A | 10/1979 | Boje et al. | 266/60 |
| 4,180,248 A | 12/1979 | Benko | 266/67 |
| 4,202,707 A | 5/1980 | Hennecke | 148/9 R |
| 4,225,769 A | 9/1980 | Wilkins | 219/130.4 |
| 4,251,205 A | 2/1981 | Roeder et al. | 431/263 |
| 4,305,573 A | 12/1981 | Boje et al. | 266/60 |
| 4,333,635 A | 6/1982 | Koukal | 266/64 |
| 4,363,468 A | 12/1982 | Noe | 266/76 |
| 4,410,266 A | 10/1983 | Seider | 356/45 |
| 4,444,169 A | 4/1984 | Kirisawa et al. | 123/344 |
| 4,466,069 A | 8/1984 | Balfanz | 364/475 |
| 4,475,719 A | 10/1984 | Lotz | 266/48 |
| 4,478,393 A | 10/1984 | Komma et al. | 266/49 |
| 4,527,777 A | 7/1985 | Lotz | 266/50 |
| 4,602,967 A | 7/1986 | Komma et al. | 148/9 R |
| 4,644,173 A | 2/1987 | Jeffers | 250/554 |
| 4,708,493 A | 11/1987 | Stein | 374/128 |
| 4,735,399 A | 4/1988 | Lotz | 266/50 |
| 4,742,236 A | 5/1988 | Kawakami et al. | 250/554 |
| 4,764,669 A | 8/1988 | Decker et al. | 250/202 |
| 4,775,774 A | 10/1988 | Caneer, Jr. | 219/121.55 |
| 4,814,577 A | 3/1989 | Dallavalle et al. | 219/121.57 |
| 4,817,020 A | 3/1989 | Chande et al. | 364/557 |
| 4,819,658 A | 4/1989 | Kolodner | 128/736 |
| 4,881,823 A | 11/1989 | Tanaka et al. | 374/126 |
| 4,996,407 A | 2/1991 | Traxler | 219/121.54 |
| 5,017,752 A | 5/1991 | Severance, Jr. et al. | 219/121.59 |
| 5,038,016 A | 8/1991 | Robertson et al. | 219/121.83 |
| 5,039,837 A | 8/1991 | Nourbakhsh et al. | 219/121.48 |
| 5,070,227 A | 12/1991 | Luo et al. | 219/121.55 |
| 5,071,106 A | 12/1991 | Helkenberg | 266/58 |
| 5,106,201 A | 4/1992 | Neuhaus | 374/131 |
| 5,166,494 A | 11/1992 | Luo et al. | 219/121.55 |
| 5,189,277 A | 2/1993 | Boisvert et al. | 219/121.54 |
| 5,225,658 A | 7/1993 | Yamaguchi et al. | 219/121.57 |
| 5,232,196 A | 8/1993 | Hutchings et al. | 251/129.08 |
| 5,262,612 A * | 11/1993 | Momany et al. | 219/121.67 |
| 5,272,312 A | 12/1993 | Jurca | 219/121.83 |
| 5,288,970 A | 2/1994 | Nishi | 219/121.56 |
| 5,290,995 A | 3/1994 | Higgins et al. | 219/121.44 |
| 5,326,955 A | 7/1994 | Nishi et al. | 219/121.56 |
| 5,380,976 A | 1/1995 | Couch, Jr. et al. | 219/121.44 |
| 5,396,043 A | 3/1995 | Couch, Jr. et al. | 219/121.5 |
| 5,414,236 A | 5/1995 | Couch, Jr. et al. | 219/121.39 |
| 5,424,507 A | 6/1995 | Yamaguchi | 219/121.44 |
| 5,463,202 A * | 10/1995 | Kurosawa et al. | 219/121.83 |
| 5,506,386 A | 4/1996 | Gross | 219/121.64 |
| 5,521,350 A | 5/1996 | Nishi et al. | 219/121.56 |
| 5,522,424 A | 6/1996 | Dalton, Jr. et al. | 137/560 |
| 5,591,357 A | 1/1997 | Couch, Jr. et al. | 219/121.39 |
| 5,614,110 A | 3/1997 | Shintani et al. | 219/121.44 |
| 5,638,389 A * | 6/1997 | Nagano et al. | 372/31 |
| 5,653,896 A | 8/1997 | Couch, Jr. et al. | 219/121.44 |
| 5,695,662 A | 12/1997 | Couch, Jr. et al. | 219/121.39 |
| 5,717,187 A | 2/1998 | Rogozinski et al. | 219/121.54 |
| 5,756,960 A | 5/1998 | Rogozinski et al. | 219/121.54 |
| 5,801,355 A | 9/1998 | Saio et al. | 219/121.44 |
| 5,844,196 A | 12/1998 | Oakley | 219/121.54 |
| 5,866,869 A | 2/1999 | Schneider et al. | 219/121.39 |
| 5,866,872 A | 2/1999 | Lu et al. | 219/121.56 |
| 5,893,986 A | 4/1999 | Oakley et al. | 219/121.59 |
| 6,021,682 A | 2/2000 | Zeng | 73/866 |
| 6,028,287 A | 2/2000 | Passage et al. | 219/121.56 |
| 6,121,570 A | 9/2000 | Oakley et al. | 219/121.51 |
| 6,133,543 A | 10/2000 | Borowy et al. | 219/121.57 |
| 6,188,041 B1 | 2/2001 | Kim et al. | 219/121.63 |
| 6,239,434 B1 | 5/2001 | Brown | 250/339.15 |
| 6,274,841 B1 | 8/2001 | Ramakrishnan et al. | 219/121.44 |
| 6,332,463 B1 | 12/2001 | Farrugia et al. | 128/204.18 |
| 6,344,625 B1 | 2/2002 | Kim et al. | 219/121.62 |
| 6,346,712 B1 | 2/2002 | Popovic et al. | 250/554 |
| 6,350,988 B1 | 2/2002 | Brown | 250/339.07 |
| 6,359,251 B1 | 3/2002 | Picard et al. | 219/121.57 |
| 6,365,868 B1 | 4/2002 | Borowy et al. | 219/121.54 |
| 6,590,181 B2 * | 7/2003 | Choo et al. | 219/121.68 |
| 6,642,482 B2 | 11/2003 | Rappi et al. | 219/130.5 |
| 2002/0088783 A1 | 7/2002 | Weber | 219/121.78 |
| 2004/0129687 A1 | 7/2004 | Yamaguchi et al. | 219/121.39 |

* cited by examiner

FIG. 4

| | PFC1 | PFC2 | |
|---|---|---|---|
| Preflow Setting | 0 | 0 | psig |
| Ignition Setting | | 0 | psig |
| Outflow Setting | 0 | 0 | psig |
| Rampdown Setting | 0 | 0 | psig |
| Shutoff Setting | 0 | 0 | psig |
| Postflow Setting | 0 | 0 | psig |
| Postflow Delay | 0 | 0 | sec |
| Postflow Time | 0 | 0 | sec |
| Supply On Time | 0 | | sec |
| Preflow Time | 0 | | sec |
| Purge Time | 0 | | sec |
| Pierce Time | 0 | | sec |
| Creep Time | 0 | | sec |
| Rampdown Delay | 0 | | sec |

| Power Supply Type | HT2000 RevE ∨ |
|---|---|
| Torch Type | MAX200 |
| Material Type | Mild Steel |
| Current Setting | 200A |
| Plasma/Shield Gases | Air/Air |
| Cutting Surface | Above Water |
| Material Thickness | 3/16" |
| Water Muffler | Not Installed |
| Cut Speed | 600 rpm |
| Kerf | 0.2 in |
| Set Arc Voltage | 50 volts |
| Cut Height | 0.01 in |
| Pierce Height | 200 % 0.02 in |
| Retry on Transfer Fail | 0 times |

[Save Data] [Reset Data] [Save Database] [Reset Database] [Test Gas] [Done]

Oxy Fuel-Torch Tip Life
Last Torch Tip Installed
12 Jul 1999 2:08 PM 289.2 minutes
83 pieces
4465.401 inches

Plasma-Torch Tip Life
Last Torch Tip Installed
28 Jul 1999 2:29 PM 15.6 minutes
38 pieces
325.61 inches

Plasma-Electrode-Life
Last Electrode Installed
28 Jul 1999 12:19 PM 21.6 minutes
132 pieces
1202.697 inches New Torch Tip | New Electrode | Manual Options | Reset Database | Upload Database | Save Database | Done

FIG. 5B

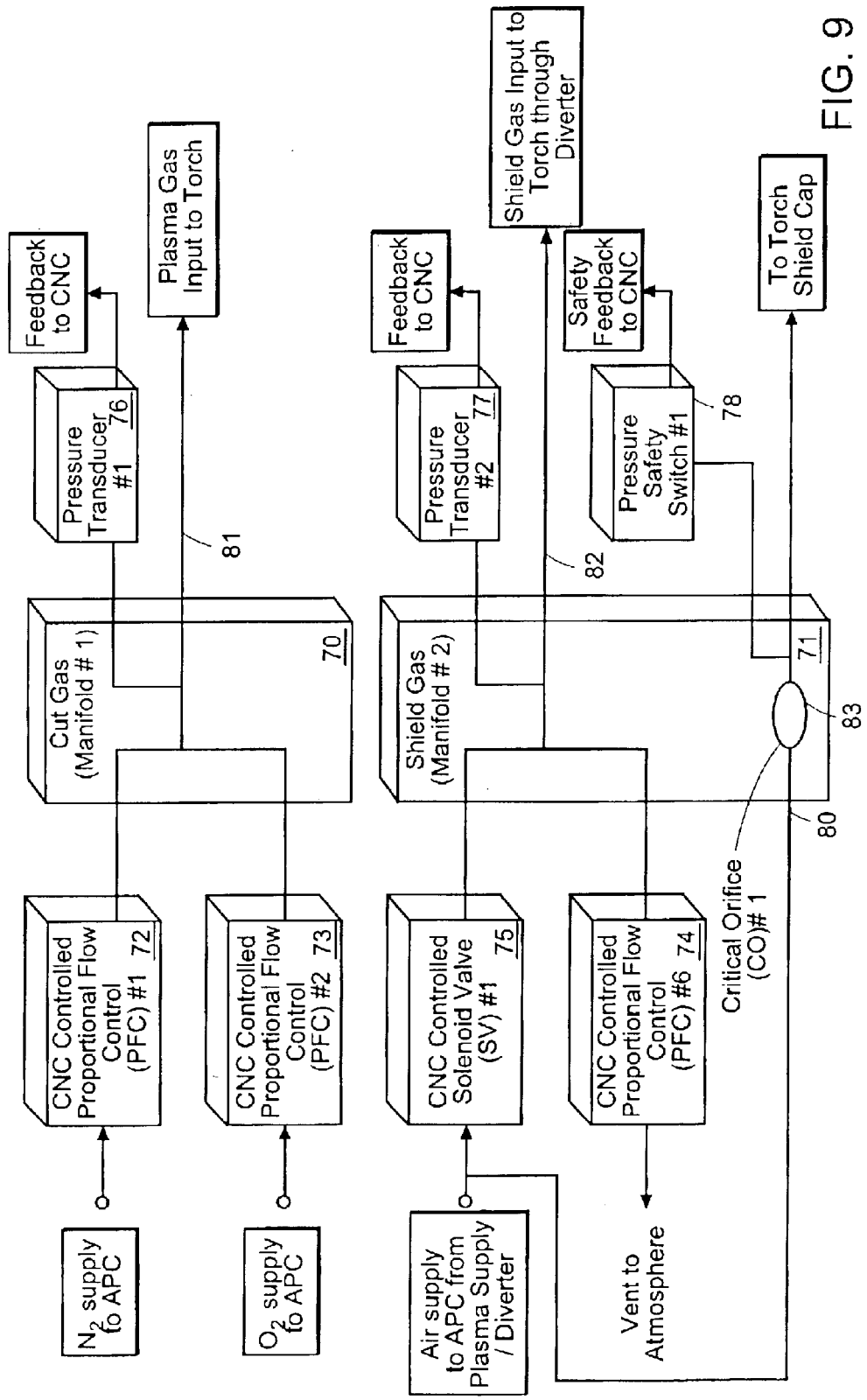

CENTRALIZED CONTROL ARCHITECTURE FOR A LASER MATERIALS PROCESSING SYSTEM

RELATED APPLICATIONS

This application is a continuation-in-part of U.S. Ser. No. 09/546,155, filed on Apr. 10, 2000 now U.S. Pat. No. 6,622,055. This application claims priority to and incorporates by reference in its entirety U.S. Ser. No. 09/546,155.

FIELD OF THE INVENTION

The present invention relates to a centralized control architecture for operating a material processing system.

BACKGROUND OF THE INVENTION

Material processing apparatus, such as lasers and plasma arc torches, are widely used in the cutting, welding, and heat treating of metallic materials. A laser-based apparatus generally includes a nozzle through which a gas stream and laser beam pass to interact with a workpiece. Both the beam and the gas stream exit the nozzle through an orifice and impinge on a target area of the workpiece. The laser beam heats the workpiece. The resulting heating of the workpiece, combined with any chemical reaction between the gas and workpiece material, serves to heat, liquefy and/or vaporize a selected area of workpiece, depending on the focal point and energy level of the beam. This action allows the operator to cut or otherwise modify the workpiece.

Similarly, a plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum that exits through the nozzle orifice and impinges on the workpiece. Gases used in the torch can be non-reactive (e.g., argon or nitrogen), or reactive (e.g., oxygen or air).

It is generally desirable that the results of any material processing be of high quality. For example, the edges of the cut kerf produced by laser and plasma cutting should be dross-free, smooth, straight and uniform. Edge irregularities caused by, for example, uneven heating of the workpiece by the laser, excessive chemical reactions between the assist gas and workpiece, or incomplete removal of cutting debris, should be minimized.

Presently, the operation of CNC-controlled plasma arc or laser cutting systems typically requires several manual parameter adjustments to achieve workpiece processing results of desired quality. Consequently, users typically choose conservative values of process parameters to ensure process reliability over a wide range of operating conditions. The tradeoff often results in an accompanying decrease in material processing productivity (e.g., due to a reduced cutting speed in laser cutting). For more aggressive process parameters to be used, a reliable and automated means of monitoring the cutting process is necessary, which could alert the user to degradation in the quality of the cut in real time. Such a system could also be required to adjust to changes in operating conditions to maintain optimal process performance, i.e., good cut quality and maximum productivity.

SUMMARY OF THE INVENTION

In one aspect, the present invention relates to a control architecture for a material processing system. In particular, in one embodiment, the invention relates to a centralized control architecture for a laser beam cutting system, in which the "intelligence" of the system is integrated into a single controller. In another embodiment, the invention relates to a centralized control architecture for a plasma arc cutting system, in which the "intelligence" of the system is integrated into a single controller.

In one aspect, the invention features a method of controlling an integrated laser beam system. According to one embodiment of the method, a first group of process parameters are input into a controller. A second group of process parameters are generated based on the first group of process parameters. At least one command signal is provided from the controller to at least one auxiliary device to control an output parameter generated by the at least one auxiliary device. At least one auxiliary device is either an energy source or an automatic process controller. The output parameter generated by the auxiliary device is detected and the command signal provided to the auxiliary device is adjusted based on the detected output parameter.

In another aspect, the invention features a method of controlling an integrated material processing stream system. In one embodiment, the material processing stream is a laser beam. In another embodiment, the material processing stream is a plasma arc.

At least one auxiliary device can be the automatic process controller. The pressure of gas exiting the automatic process controller can be detected and the command signal provided to the automatic process controller for controlling the gas flow can be adjusted based on the pressure. At least one auxiliary device can be the energy source for the laser beam. A feedback signal generated by the energy source indicative of an energy beam of the laser system can be detected and the command signal provided to the energy source for controlling the energy beam of the laser system can be adjusted based on the feedback signal.

At least one auxiliary device can include a first auxiliary device and a second auxiliary device. A first output parameter generated by the first auxiliary device can be detected and the command signal provided to the second auxiliary device can be adjusted based on the first output parameter. For example, the first auxiliary device can be the automated process controller and the second auxiliary device can be the energy source for a laser beam. The pressure of an outlet gas exiting the automated process controller can be detected and the command signal provided to the energy source for controlling laser beam energy can be adjusted based on the pressure. A feedback signal generated by the energy source indicative of an energy beam of the laser system can be detected and the command signal provided to the automatic process controller for controlling the gas flow can be adjusted based on the feedback signal. Alternatively, the first auxiliary device can be the energy source and the second auxiliary device can be a laser height controller. The feedback signal generated by the energy source can be detected and the command signal provided to the laser height controller for controlling a standoff can be adjusted based on the feedback signal.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 4 is a screen shot of a controller display screen according to one embodiment of the present invention.

FIG. 5B is a screen shot of a change consumables screen of a controller according to one embodiment of the present invention.

FIG. 9 is a block diagram illustrating an automatic process controller according to one embodiment of the present invention.

DETAILED DESCRIPTION OF THE INVENTION

The present invention relates to a centralized control architecture for a material processing system which dispenses a material processing stream, in which the "intelligence" of the system is integrated into a single controller. The centralized control architecture eliminates redundant hardware and software and integrates the entire system, thereby improving performance and reducing cycle time. In one embodiment, the material processing system is a plasma arc processing system, which dispenses a plasma arc as a material processing stream and includes the centralized control architecture. This embodiment will be referred to herein as a closely-coupled plasma arc system or simply a plasma arc system. In another embodiment, which is described below, the material processing system is a laser beam processing system which dispenses a laser beam as a material processing stream and includes the centralized control architecture. This embodiment will be referred to herein as a closely-coupled laser beam system or simply a laser beam system.

Figure 1:
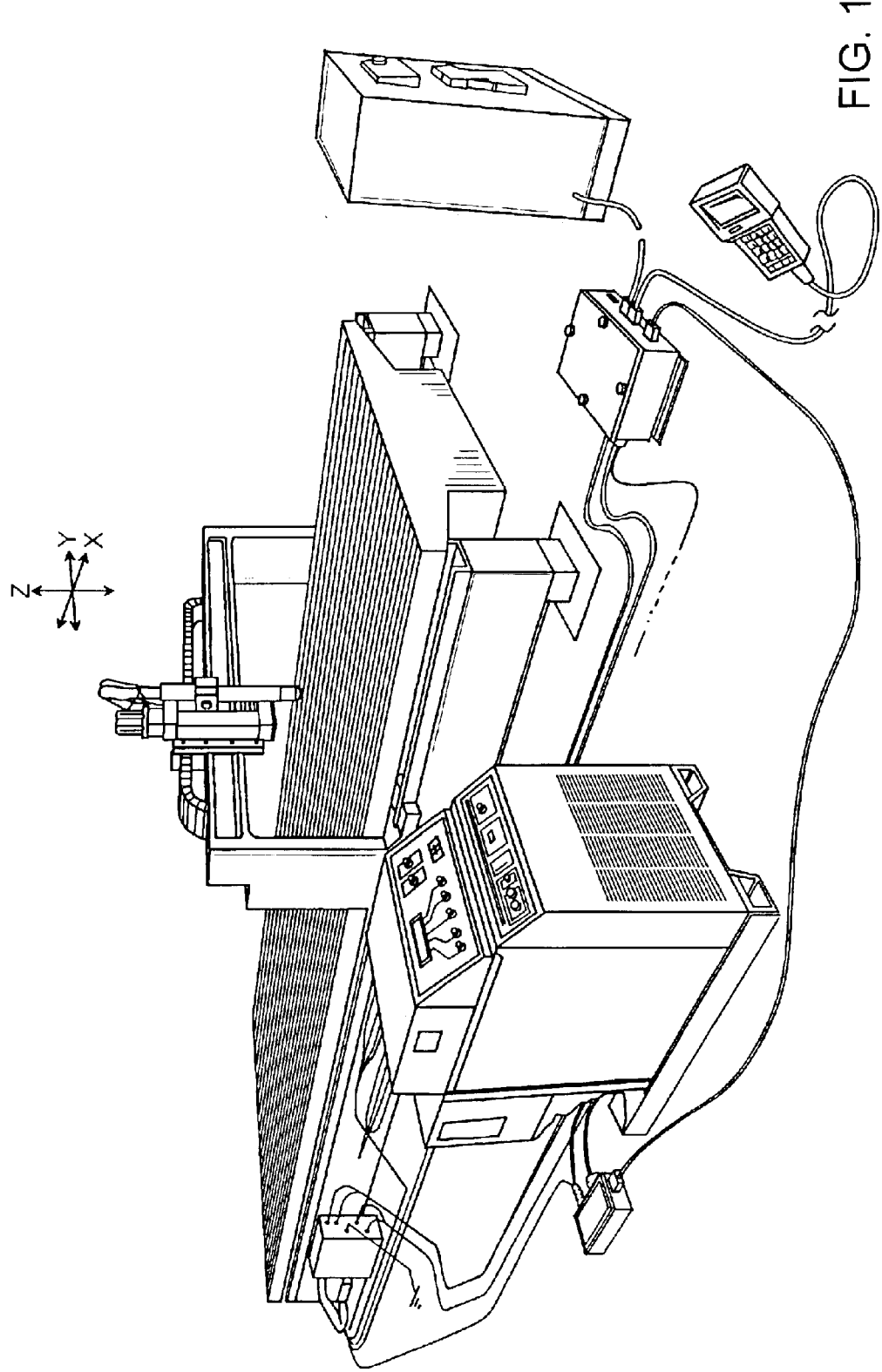
FIG. 1 is a schematic diagram of an automated plasma arc system.
Figure 2:
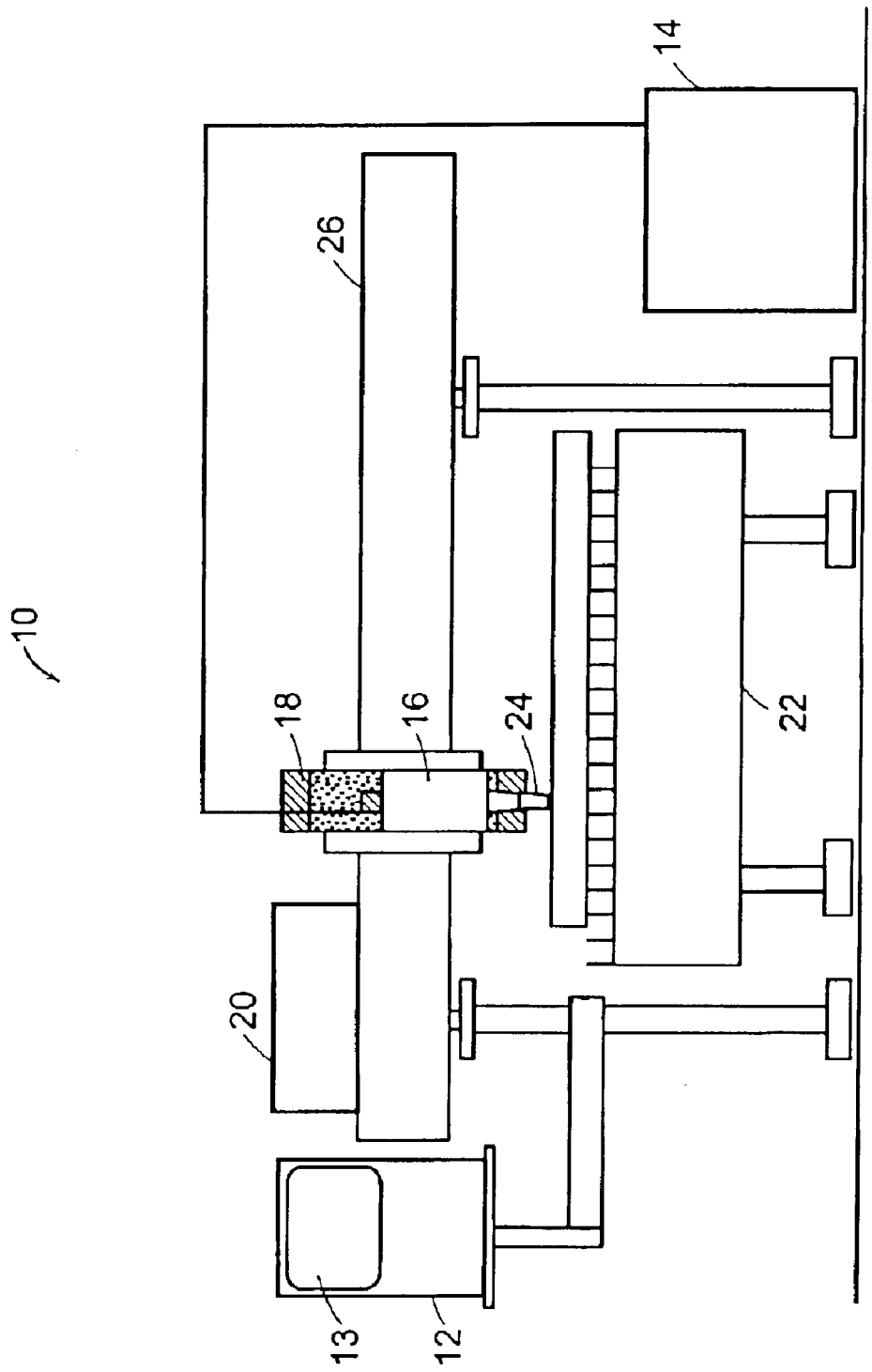
FIG. 2 is a schematic diagram of a closely-coupled plasma arc system according to one embodiment of the present invention.

Referring to FIG. 2, a closely-coupled plasma arc system 10 includes a computerized numeric controller (CNC) 12 display screen 13, a power supply 14, an automatic process controller 16, a torch height controller 18, a drive system 20, a cutting table 22, and a plasma arc torch 24.

In general, the CNC 12 controls the motion of the plasma arc torch 24 over the cutting table 22 and the timing of the cutting process as the process relates to the motion. In the present invention, the CNC 12 is capable of controlling, not only the motion of the plasma arc torch 24, but also the operation of the other components of the plasma arc system 10, as well as other cutting processes. The various components of the plasma arc system 10 can be controlled by the CNC 12 concurrently.

The CNC 12 interfaces with the user. The CNC 12 allows the user to select or provide certain process parameters. The CNC 12 generates other process parameters necessary to operate the plasma arc system 10 based on the user selection and/or input. A cut program 600 as later shown in FIG. 16, provides part specific information for torch motion and cutting arc operation. The CNC 12 commands the power supply 14, the automatic process controller 16, the torch height controller 18 and the drive system 20 to operate. The CNC 12 also monitors certain process conditions to determine whether the plasma arc system 10 is operating properly. Based on the monitored information, the CNC 12 adjusts the operation of the other components of the plasma arc system 10, if necessary. Details of the CNC 12 will be described in greater detail in reference to FIGS. 3, 4, 5A–5B, and 15–20.

The power supply 14 generates a high frequency signal sufficient to ionize a gas to generate a plasma arc and a DC signal to maintain the arc. In the present invention, all intelligence and adjustment controls for configuring the cut process typically provided in a power supply have been migrated into the CNC 12 and/or the automatic process controller 16. Upon receiving an appropriate command signal from the CNC, the power supply 14 transforms an input signal into an output signal sufficient to generate and maintain a plasma arc. Several components of the power supply 14, including the output generated by the power supply 14 are controlled by the CNC 12 through a feedback mechanism. The power supply 14 will be discussed in greater detail in reference to FIGS. 6 and 7A–7C.

The automatic process controller 16 is designed to replace the manual gas flow controls that are normally located at the power supply and/or a gas control module. The automatic process controller 16 includes proportional flow control valves to control the flow rate of the cut gas and the shield gas. Servo control valves, alternatively, may be used in place of the proportional flow control valves. In one embodiment, the servo control valve may be a two-way, two-port pneumatic flow control servo valve, model number 300106-001 sold by Victory Controls, LLC of Bristol, Conn. The automatic process controller 16 also includes pressure transducers for measuring the pressure of the cut gas and the shield gas. This pressure information is provided to the CNC 12, which in turn adjusts the proportional flow control valves if necessary to change the flow rates. The intelligence of the automatic process controller 16 is also located at the CNC 12. The automatic process controller 16 is described in greater detail in reference to FIGS. 8–12.

The torch height controller 18 controls the standoff between the torch 24 and the work piece. Unlike a conventional torch height controller 18, however, the intelligence of the torch height controller 18 is migrated into the CNC 12. The torch height controller 18 is controlled directly from the CNC 12 as a separate servo axis in a manner similar to the drive system 20 in a conventional plasma arc system. The CNC 12 provides a command signal to the torch height controller 18 to adjust the standoff, based on the arc voltage measured at the plasma arc torch 24. The torch height controller 18 is described in greater detail in reference to FIGS. 13 and 14.

The drive system 20 receives command signals from the CNC to move the plasma arc torch 24 in an x or y direction over the cutting table 22. The cutting table 22 supports a work piece. The plasma arc torch 24 is mounted to the torch height controller 18 which is mounted to the gantry 26. The drive system 20 moves the gantry 26 relative to the table 22 and moves the plasma arc torch 24 along the gantry 26. The information about the position of the plasma arc torch 24 is provided to the CNC 12. Thus, the CNC 12 allows interactive response and maintains an accurate cut path. Operation of the drive system 20 and the cutting table 22 do not constitute an inventive aspect of the present invention and are well known to those skilled in the art.

The Computer Numeric Controller

The CNC 12 includes a display, a hard disk, a microprocessor, and random access memory (RAM). The display, for example, can be a Video Graphic Array (VGA) color Double Super Twisted Nematic (DSTN) liquid crystal display (LCD) or an active matrix thin-film-transistor (TFT) display. The CNC 12, for example, can include 2.1 Gigabytes of hard disk and optionally also include a floppy disk drive. The microprocessor, for example, can be 166 MHz Pentium® processor. The CNC 12, for example, can include 32 Mbytes of random access memory (RAM). The CNC 12 can also include conductor lines for interface signals for cutting (e.g., gas control) and motion logic (e.g., tracing system, markers, homing). The motion logic can include logic for tracing systems which direct the torch 24 by tracing a drawing or part. The motion logic can include logic for marking a work piece. The motion logic can also include logic for moving the torch to a home position to provide exact location information to the CNC 12.

Figure 3:
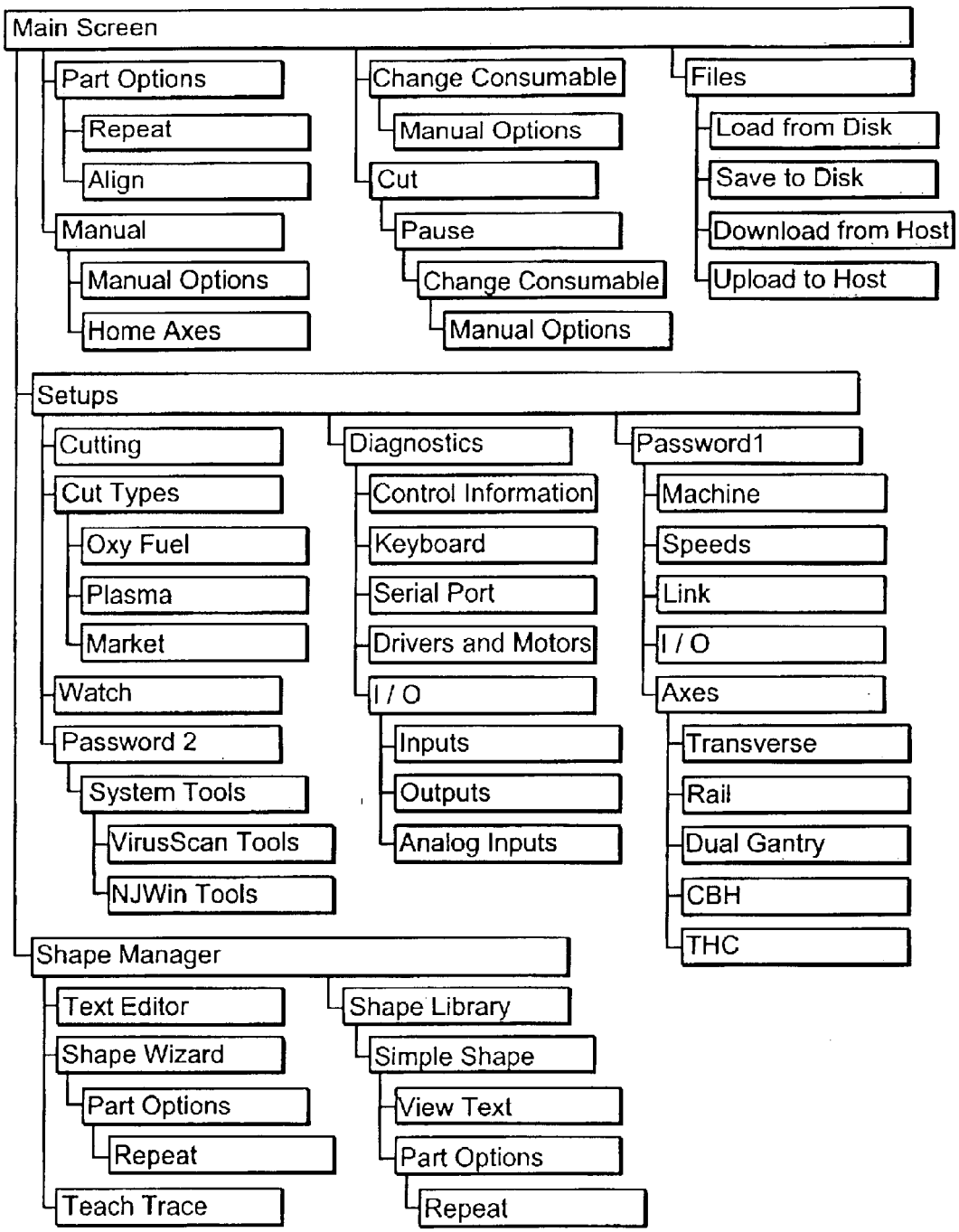
FIG. 3 is a flow chart illustrating a screen hierarchy of the controller according to one embodiment of the present invention.
Figure 5A:
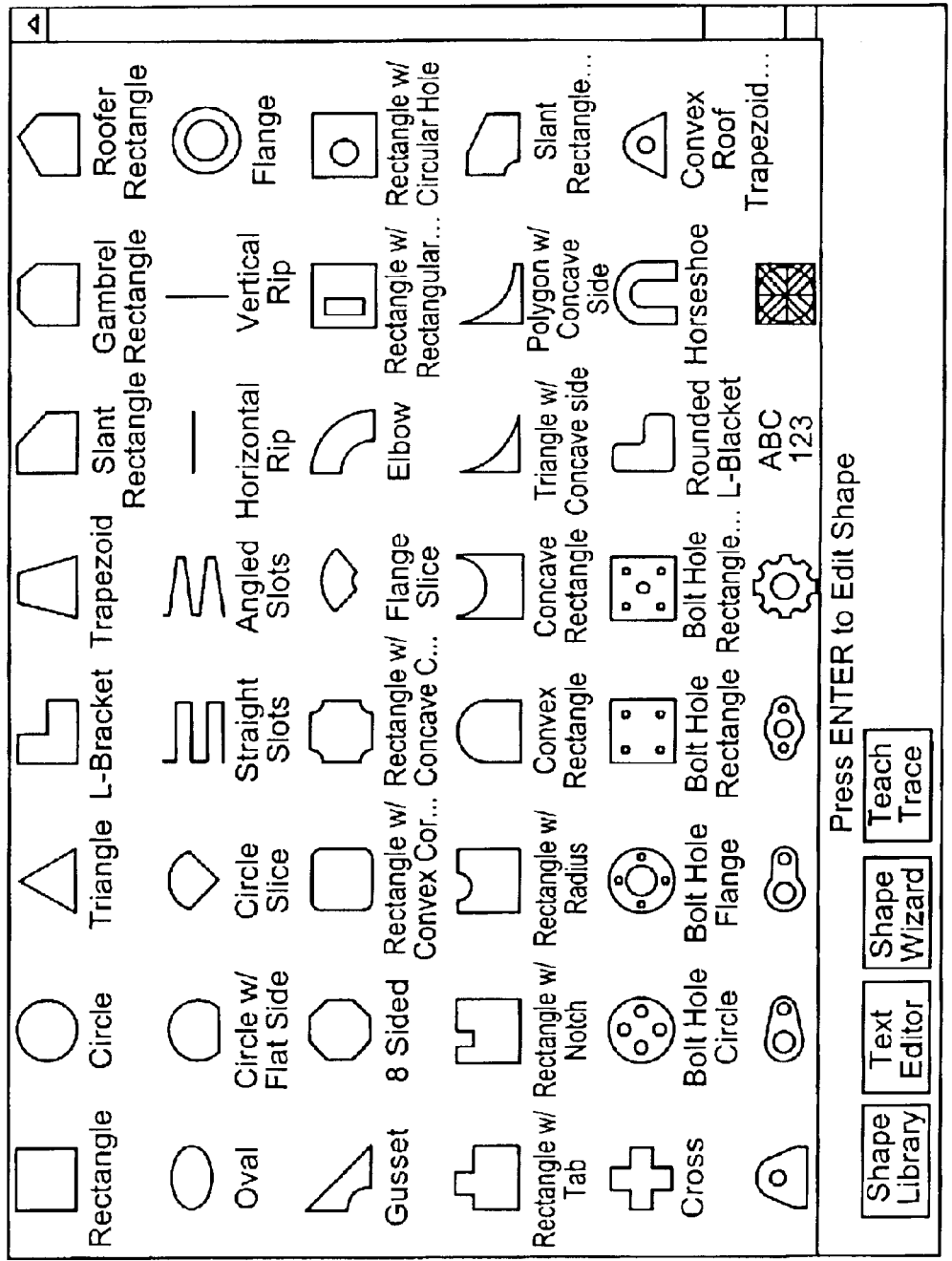
FIG. 5A is a screen shot of a parametric shape library for use in a controller according to one embodiment of the present invention.

The programming and operation of the CNC 12 is menu driven. An example screen hierarchy is illustrated in FIG. 3. In the example shown in FIG. 3, the screen hierarchy is divided into main screen, setups, and shape manager. The main screen, in part, allows a user to select options such as files of information to load or save, choices of part options and to elect manual operation of the closely-coupled plasma arc system 10. The setups screen, in part, allows selection of cutting parameters such as the cut gas to be used. The shape manager, in part, allows the user to select cut patterns from a shape library. The CNC 12 includes a graphical user interface for the user to input certain process parameters. For example, the user can provide information about the type of power supply, the type of torch, the type of material to be cut, the setting for the current, the type of plasma gas and the shield gas, the cutting surface (e.g., above water), the thickness of the material to be cut, and whether the water muffler is installed as shown in FIG. 4. The user can also select any of a number of shapes for cutting from a parametric shape library, along with the desired dimension. An example of a parametric shape library is provided in FIG. 5A.

Based on the user input process parameters, the CNC 12 generates other process parameters. These process parameters can be provided from a factory pre-set database or a user defined database. The generated process parameters can include cut speed, kerf diameter, set arc voltage, cut height, pierce height, and the number of retries upon transfer failure. The process parameters can also include pressure settings for the cut gas and the shield gas during pre-flow, ignition, cut-flow, ramp-down, shut-off, and post-flow. The process parameters can further include settings for the duration of the post-flow, supply-on, pre-flow, purge, pierce, creep, and ramp-down delay. FIG. 4 shows other process parameters generated in response to the user input process parameters. Upon receiving the user input to initiate the plasma arc system 10 and generating all of the parameters necessary to start the operation of the plasma arc system, the CNC 12 executes software programs to initiate and control the operation of the various components of the plasma arc system 10. The software program will be discussed in greater detail in reference to FIGS. 15–20.

In one embodiment, the CNC 12 includes a database for tracking and recording consumable life. For example, if a new electrode or nozzle is placed in the plasma torch, this information is provided to the CNC 12. The database will record the date and time the consumable was changed and how long it lasted in minutes, pierces, inches and millimeters. An example of a change consumable screen provided by the CNC is shown in FIG. 5B.

Power Supply

Figure 6:
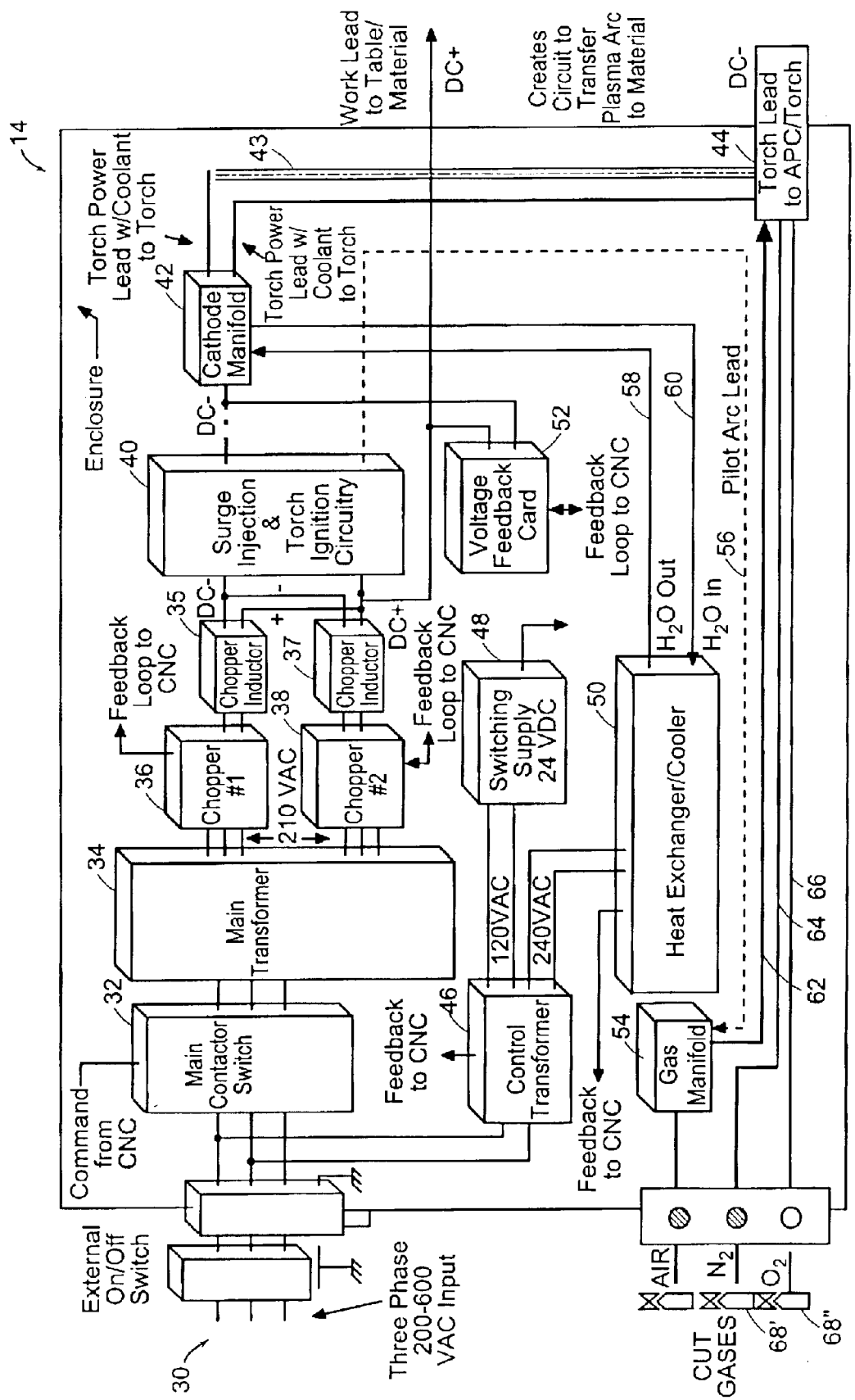
FIG. 6 is a block diagram illustrating a closed-loop power supply according to one embodiment of the present invention.

The purpose of a power supply 14 is to combine electrical power and gases to create an ionized gas for metal cutting. FIG. 6 shows an embodiment of the power supply 14 of the current invention. The electrical power of the power supply 14 is controlled by the CNC 12 (shown in FIG. 2), and the gas supply is controlled by the APC 16 (shown in FIG. 2).

Referring to FIG. 6, the power supply 14 includes a three phase power supply input 30. The three phase power supply input 30 is in electrical communication with a main contactor switch 32. The main contactor switch 32 is in electrical communication with a main transformer 34. The main transformer 34 is in electrical communication with a dc power module. The dc power module can be a chopper, an invertor or a silicon controlled rectifier. In the embodiment illustrated in FIG. 6, the dc power modules are a first chopper module 36 and a second chopper module 38. The first chopper module 36 and second chopper module 38 are in electrical communication with a first chopper inductor 35 and a second chopper inductor 37. The chopper inductors 35, 37 are in electrical communication with surge injection and torch ignition circuitry module 40. The surge injection and torch ignition circuitry module 40 is in electrical communication with the cathode manifold 42 which is in electrical connection with a torch power and coolant lead 43. A voltage feedback card 52 is in electrical communication with the surge injection and torch ignition circuitry module 40.

The power supply 14 also includes a control transformer 46 which is in electrical communication with the three phase power supply input 30. The control transformer 46 is in electrical communication with a switching supply 48 and a heat exchanger/cooler unit 50. A pair of coolant leads 58, 60 extend from the heat exchanger cooler unit 50 and the cathode manifold 42.

The power supply 14 also includes a gas manifold 54. A pilot arc lead 56 extends from the surge injection and torch ignition circuitry module 40 to the gas manifold 54. A shield gas and pilot arc lead 62 extends from the gas manifold 54 to the torch lead 44. The cut gas leads 64, 66 extend from the cut gas sources 68', 68" through the power supply 14 to the torch lead 44.

In operation, the three phase power supply input 30 receives an input signal. The input signal can be an AC signal within a voltage range from about 200 volts to 600 volts. The input 30 provides power to the main transformer 34 through the main contactor switch 32. The main transformer 34 converts the incoming power through two secondary windings (not shown). Each winding provides power to the chopper modules 36, 38. For example, the main transformer can provide 210 VAC signal to each chopper module 36, 38. The chopper modules 36, 38 provide the cutting voltage supplied to the torch 24. The three phase power supply input 30 also provides power to the control transformer 46 which converts the incoming power through two secondary windings (not shown) of the control transformer 46. The two secondary windings of the control transformer 46 provide power to both the heat exchanger or unit 50 and the switching supply 48. For example, the control transformer 46 can provide 120 VAC signal to the switch power supply 48 and 240 VAC signal to the heat exchanger/cooler unit 50. The switching supply 48 provides 24 VAC signal to the CNC 12 to provide additional power the CNC 12.

The chopper inductors 35, 37 provide rectified DC output signal to sustain the electric arc at the torch 24. The surge injection and torch ignition circuitry 40 provides the high frequency and initial surge current to ignite the torch 24.

The DC output signals of the chopper inductors 35, 37 are monitored by the voltage feedback card 52. When the power supply 14 is energized via the main contactor switch 52, the voltage feedback card 32 signals the CNC 12 that the power supply 14 is ready. When a pilot arc is established, the voltage feedback card 52 signals the CNC 12. When the cutting arc is established, the voltage feedback card 52 signals the CNC 12 to begin motion. Once transfer of the arc has occurred and motion is engaged, the voltage feedback card 52 is used to provide voltage feedback to the CNC 12, and the arc voltage is adjusted by the CNC 12 using the torch height control 18. If there is any failure during this process, the failure is detected by the CNC 12, the process is halted, and an error message is posted by the CNC 12.

The power supply 14 can operate in one of several ways. One way of operating the power supply 14 is in a full auto-mode. Once a part program and plasma process has been selected by the operator, simply push the START button and the CNC 12 will check to see if the power supply 14 is on and, if not, will energize the power supply 14 and verify its status. The CNC 12 will then continue executing the part program as normal. Any fault condition results in a power supply shut down, and an error message is provided to the operator.

The second way of operating the power supply 14 is in a remote manual mode. The operator can manually energize the power supply 14 by going to the diagnostics screen in the CNC 12 and selecting SUPPLY ON. This allows remote diagnostics and testing to be performed.

The third way of turning on the power supply 14 is in a local manual mode. A properly trained service agent can manually energize the power supply by opening the power supply 14 and engaging the SUPPLY ON relay.

During the power up sequence for the power supply 14, the CNC 12 receives signals that confirm the presence of the three phase power supply input 30. Without the signal from the power supply 14, the CNC 12 will time out, shut down, and alert the operator. In addition, all of the power supply's functions can be manually tested remotely from the CNC 12 by using the diagnostic screens provided by the CNC 12.

The voltage feedback card 52 can monitor the arc voltage at the plasma arc torch 24 remotely during a cut and use that information as a feedback signal to the torch height controller (THC) 18. Because the CNC 12 controls all aspects of the power supply's functions, the voltage feedback card 52 can also perform other functions provided herein.

Once the start command has been given, the CNC 12 will energize the main contactor switch 32, allowing the choppers 36, 38 to charge their output to a full open circuit voltage. The full open circuit is detected by the voltage feedback card 52 and the information is relayed to the CNC 12. If the full open circuit is within tolerance, and all other parameters are satisfied, the CNC 12 enables the choppers 36, 38 and passes down the output current set point. The CNC 12 then engages the surge injection/torch ignition circuitry 40 to generate a high frequency signal and enables pilot arc relay. In some embodiments the torch 24 may have a spring loaded mechanism to bring the electrode and nozzle in contact to form a pilot arc. When the pilot arc is established at the torch 24, the output voltage changes, and is detected by the voltage feedback card 52. The voltage feedback card 52 relays the voltage change to the CNC 12. As the arc stretches outward to the workpiece, it eventually contacts the workpiece, and the corresponding change in voltage is also detected by the voltage feedback card 52 which relays this information to the CNC 12. The CNC 12 uses this information as the arc transfer signal and proceeds with the piercing operation.

Once the piercing operation is completed and full machine motion is engaged and stable, the voltage feedback card 52 reverts back to its original function of torch height controller 18. A fault in any of the above conditions generates an appropriate error message to the operator and the system 10 returns to STANDBY mode.

The power supply 14 includes a novel cooling system. In a typical cooling system, a pump, a tank and other components are tied to chassis ground for safety reasons. Since the electrode is at an elevated voltage level during the plasma cutting operation, electrolysis occurs within the torch leads. Testing has shown that more than 95% of coolant loss is due to electrolysis. The heat exchanger/cooler unit 50 in the power supply 14 has been designed to eliminate electrolysis. By tying all of the heat exchanger/cooler unit 50 components to the electrode's potential, electrolysis can be prevented and the coolant can be preserved. Safety is maintained by placing the heat exchanger/cooler unit 50 within a separate enclosure with appropriate labeling.

The CNC 12 can directly monitor the flow rate, flow level, and temperature of the coolant and can intelligently respond to each fault situation to correct any deficiency. In the event of an over-temperature situation, the CNC 12 will allow the cutting operation to complete its current task. Afterward, the CNC 12 will alert the operator and command the power supply 14 to a STANDBY condition. This allows the power supply 14 to remain on and keep the fans running to cool down the coolant, but disables the output of the power supply 14. If the coolant level drops too low, the CNC 12 will allow the cutting operation to complete its current task. Afterward, the CNC 12 will alert the operator and command the power supply 14 to turn off. The CNC 12 will not allow the power supply 14 to turn on again until the low coolant level condition has been satisfied. If the CNC 12 detects loss of coolant flow, it will immediately end the cutting operation, shut down the power supply 14, and alert the operator.

The CNC 12 has a direct link to the choppers 36, 38 within the power supply 14 and feeds the choppers 36, 38 an analog signal proportional to the output current desired. This allows a near-infinite resolution in the current output. During such operations as ramp-up or ramp-down of the output current, very smooth transitions are possible. This reduces the stress on the consumables within the torch, thereby extending the useful life of the consumables.

Figure 7A:
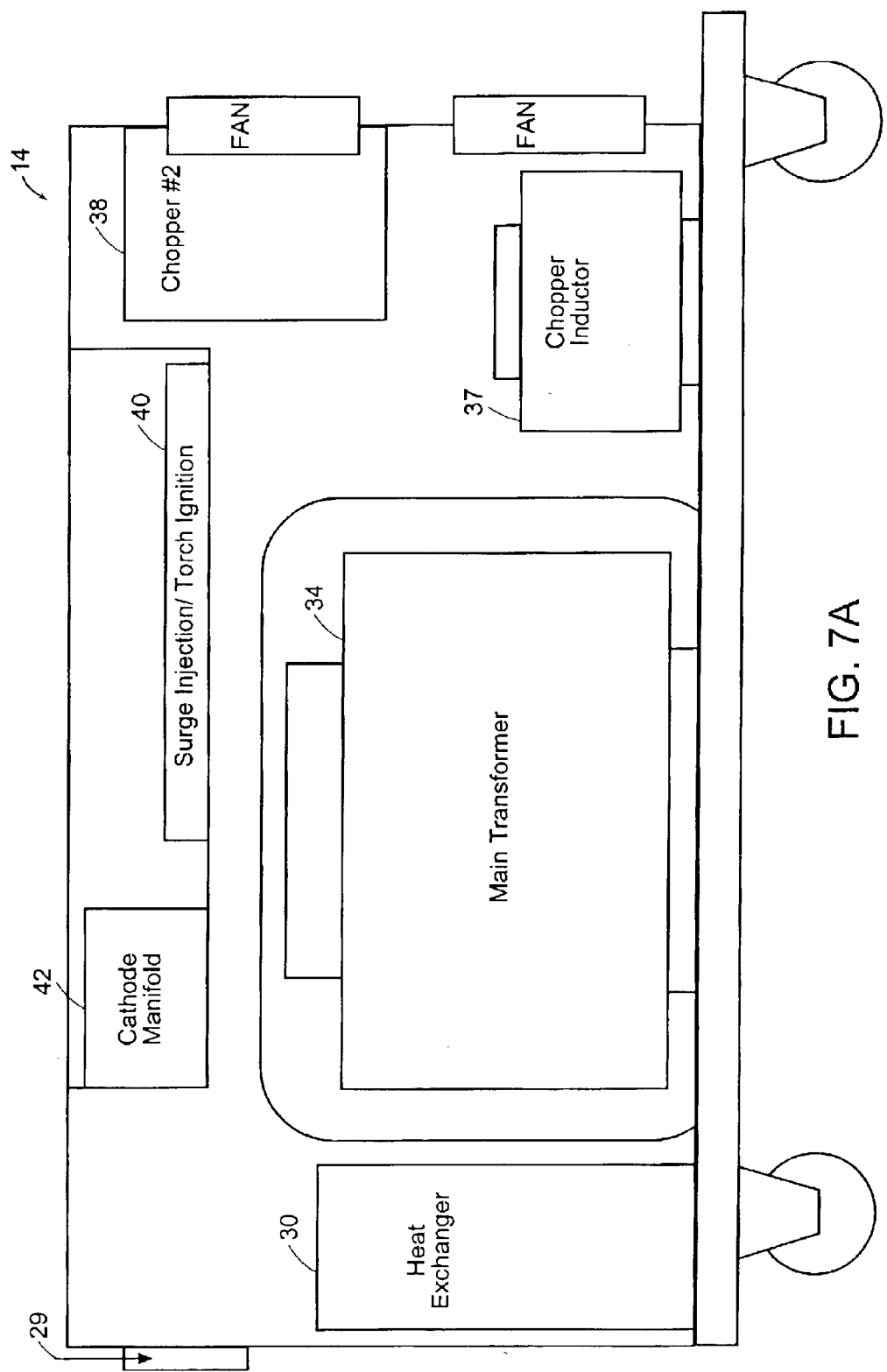
FIG. 7A is a schematic diagram of a side view of a closed-loop power supply according to one embodiment of the present invention.
Figure 7B:
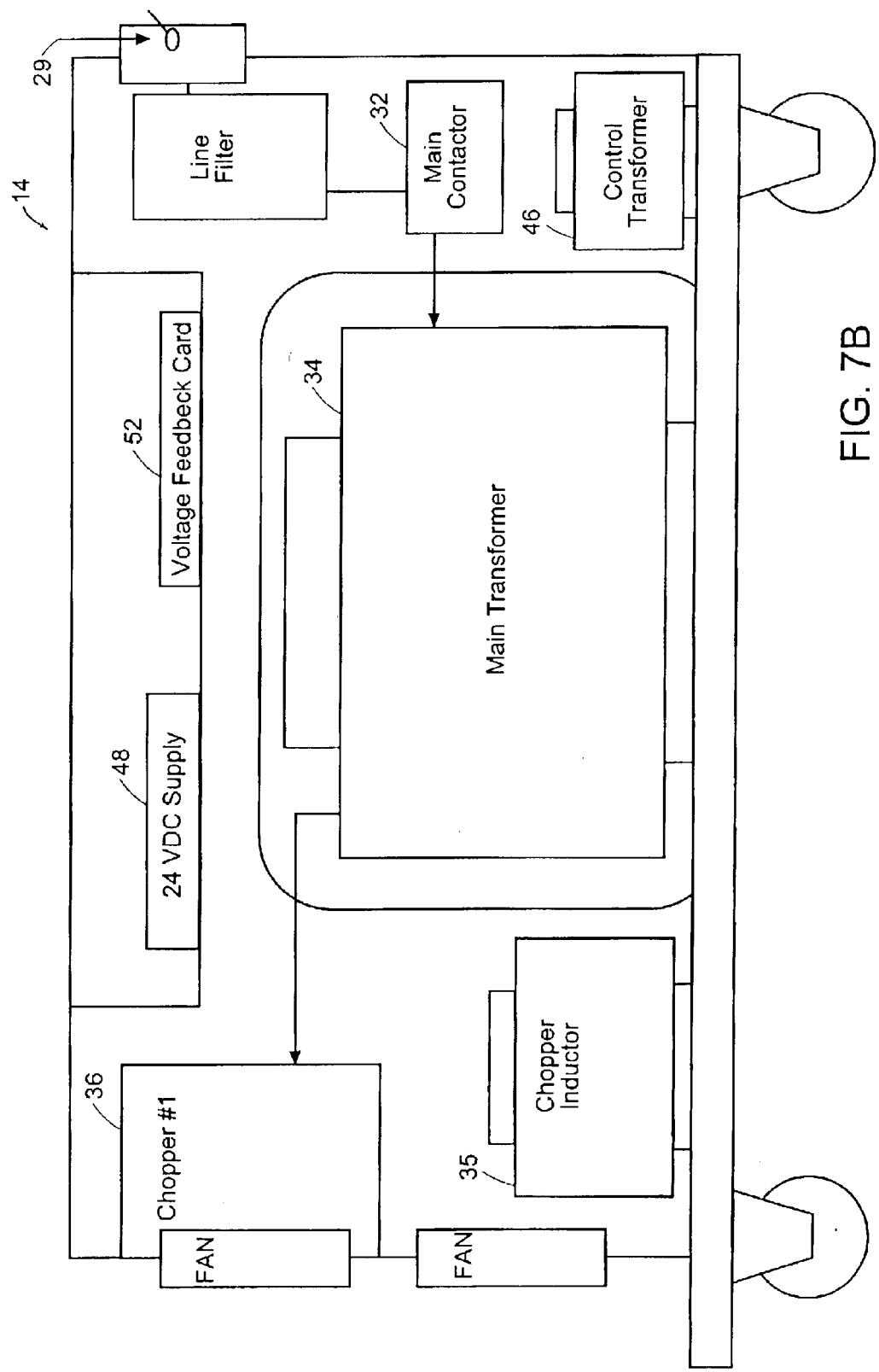
FIG. 7B is a schematic diagram of another side view of a closed-loop power supply according to one embodiment of the present invention.
Figure 7C:
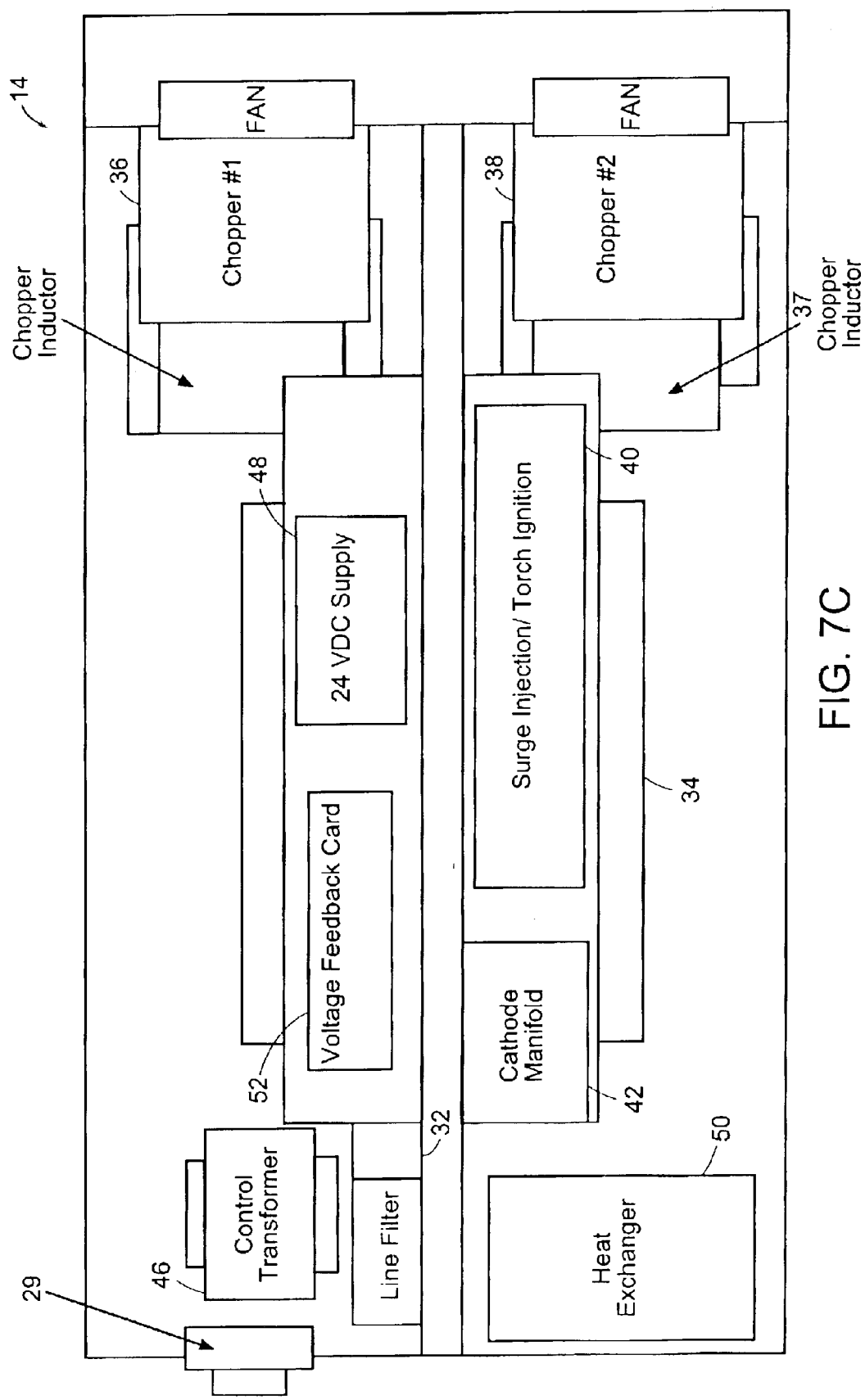
FIG. 7C is a schematic diagram of a top view of a closed-loop power supply according to one embodiment of the present invention.

FIGS. 7A–7C show physical placement of each of the components of the power supply 14. The specific placements of the components provided in FIGS. 7A–7C are exemplary only and other placements can be used in accordance with the present invention.

Automatic Process Controller

The automatic process controller 16 receives command signals from the computerized numeric controller (CNC) 12 to control the flow of gases into the plasma arc torch 24. The automatic process controller 16 eliminates the need for manually operated gas flow controls, typically located at the plasma power supply. The automatic process controller 16 replaces solenoid valves typically located at the power supply and/or gas control module with proportional flow control (PFC) valves that are located immediately prior to the body of the plasma arc torch 24.

Figure 8:
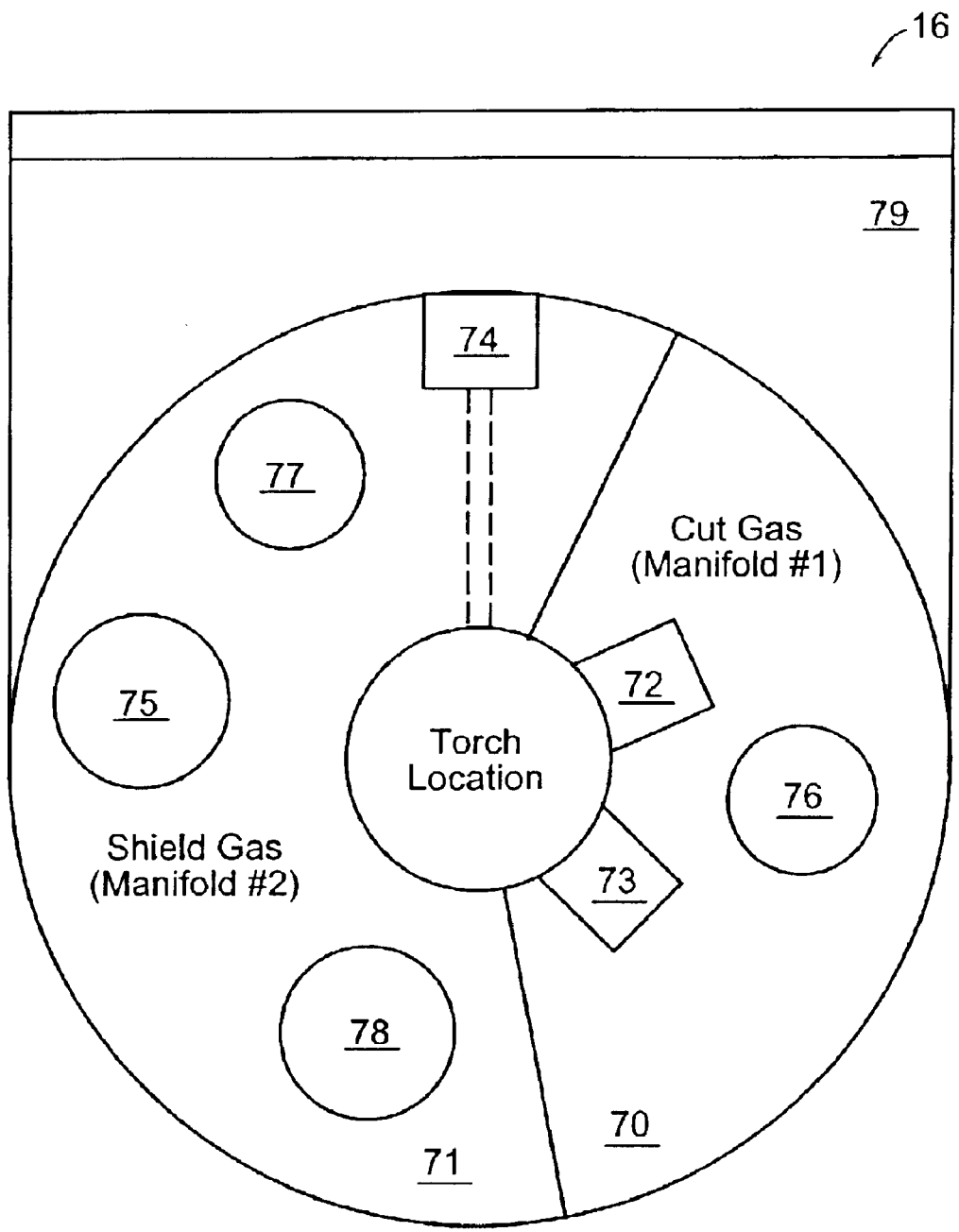
FIG. 8 is a schematic diagram of a top view of an automatic process controller according to one embodiment of the present invention.

FIG. 8 shows a top view of the automatic process controller 16. For clarity, gas hoses and hose connections are not shown. The automatic process controller 16 includes gas manifolds 70, 71, valves 72, 73, 74, 75, pressure transducers 76, 77, a pressure switch 78, and a bracket 79 for mounting the automatic process controller 16 to the torch height controller 18 shown in FIG. 13.

Referring to FIGS. 8 and 9, the automatic process controller 16 includes a first manifold 70 and a second manifold 71. The first manifold 70 is a chamber that allows blending and adjustment of one or more cut gasses provided to the plasma arc torch 24 through the use of flow control. The second manifold 71 is a chamber that allows adjustment of a shield gas provided to the plasma arc torch through the use of flow control. The automatic process controller 16 also includes a first proportional flow control (PFC) valve 72, a second proportional flow control (PFC) valve 73, and a third proportional flow control (PFC) valve 74. The first PFC valve 72 and the second PFC valve 73 are in physical communication with the first manifold 70. The first PFC valve 72 controls flow of a first cut gas. The second PFC valve 73 controls flow of a second cut gas. For example, the first cut gas can be nitrogen, and the second cut gas can be oxygen. The first cut gas and the second cut gas can be mixed in the first manifold 70.

The third PCF valve 74 is in physical communication with the second manifold 71, which is also in physical communication with a controlled solenoid valve 75. The controlled solenoid valve 75 controls application of a shield gas to the plasma arc torch. For example, the shield gas can be air. A portion of the shield gas can be vented to the atmosphere. The third PFC valve 74 controls the amount of shield gas vented to the atmosphere. Thus, the shield gas flow is controlled by purging the excess gas to the atmosphere.

The automatic process controller 16 can further include a first pressure transducer 76 and a second pressure transducer 77. Referring to FIG. 9, the first pressure transducer 76 taps into the line 81 inside the first manifold. The first pressure transducer 76 monitors an outlet pressure of either the first cut gas, the second cut gas, or a mixture of the first cut gas and the second cut gas. The pressure measurement from the first transducer 76 is provided to the CNC 12 as feedback. The CNC 12 can provide an adjustment command to the first PFC valve 72 and/or the second PFC valve 73 to adjust the cut gas flows if necessary. The second pressure transducer 77 is tapped into the line 82 inside the second manifold 71. The second pressure transducer 77 monitors the outlet pressure of the shield gas provided to the plasma arc torch 24. The pressure measurement from the second transducer 77 is provided to the CNC 12 as feedback. The CNC 12 can provide an adjustment command to the third PFC valve 74 to control the flow of the shield gas if necessary.

In operation, a user selects a cut program among many programs stored in the CNC 12 and selects certain process variables. For example, the user can select eight process variables. As discussed in reference to FIG. 4, these eight process variables include a power supply type, a torch type, a material type, a current setting, a plasma/shield gas type, a cutting surface, a material thickness and an installation of water muffler. The CNC 12 accesses an internal database and sets and adjusts the flow rates of the cut gas and the shield gas based on the process variables provided by the user. The database can be a factory default database or a user defined database. An example CNC display which illustrates parameter for gas control is shown in FIG. 4.

The CNC 12 provides command signals to the first PFC valve 72, the second PFC valve 73, the third PFC valve 74, and the controlled solenoid valve 75. In response to the command signals, the first PFC valve 72, the second PFC valve 73, and the third PFC valve 74 can adjust the flow of the applicable gas. A proportional solenoid valve allows the flow through the proportional solenoid valve to be controlled variably as opposed to a standard solenoid valve that is either completely closed or completely open. The structure and operation of an exemplary proportional solenoid valves are described in detail in U.S. Pat. No. 5,232,196, the contents of which are herein incorporated by reference.

Figure 10A:
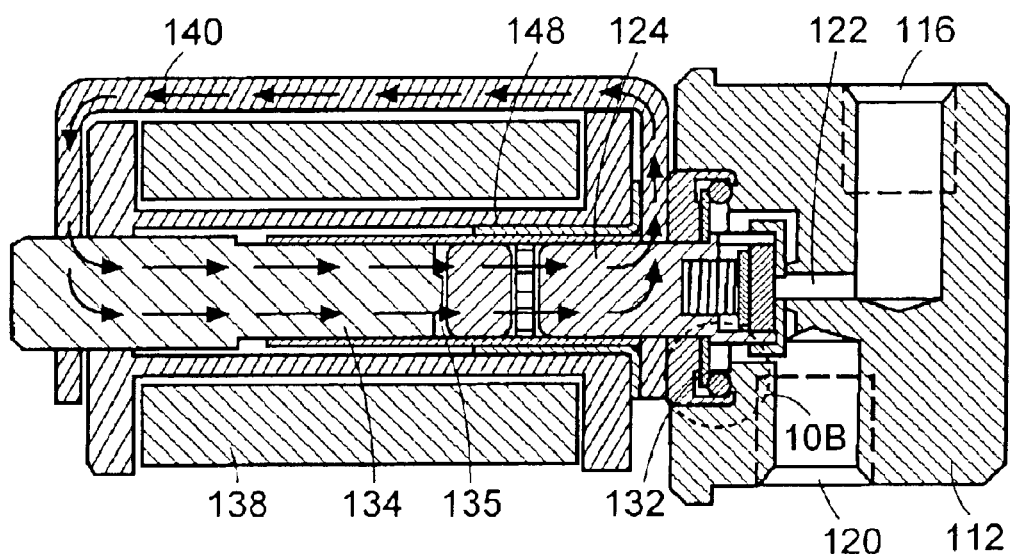
FIG. 10A is a cross-sectional view of a proportional flow control valve according to one embodiment of the present invention.
Figure 10B:
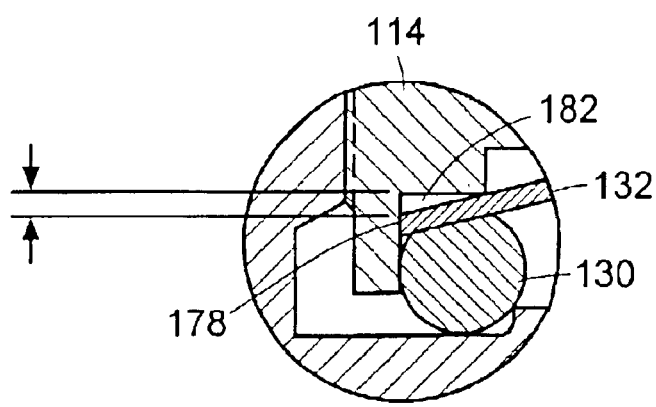
FIG. 10B is an exploded view of region A from FIG. 10A according to one embodiment of the present invention.

Referring to FIGS. 10A and 10B, a proportional solenoid valve includes a solenoid coil 138, an armature assembly 124, a yolk 140, a pole 134 and a flat spring 132. As the solenoid coil 138 is energized, the coil magnetomotive force induces a flux through yoke 140 and pole 134, across a working gap 135, through armature assembly 124, and back to yoke 140 via flux concentrator 148. The magnetic flux induces a force of attraction between the armature assembly 124 and the pole piece 134, causing the armature assembly 124 to move towards pole piece 134. As the armature assembly 124 displaces towards pole piece 134 and away from orifice 122 in the valve body 112, the flat spring 132 opposes the solenoid force and controls the magnitude of the net deflection of the armature assembly 124. Increasing the coil current increases the force of attraction between the armature assembly 124 and the pole piece 134, thereby increasing the movement of the armature assembly 124 towards pole piece 134. The flat spring 132 provides resistance to the force induced by the solenoid coil 138. The flat spring 132 is three-lobed and is constrained on its outer diameter in one of the six degrees of freedom. FIG. 10B illustrates how the outside diameter of the flat spring 132 is held between an O-ring 130 and a ledge of the armature assembly 178. As current is increased to the coil, the flow output of the valve increases proportionally. As current is decreased, the flow is decreased proportionally. The PFC valve described in reference to FIGS. 10A and 10B is exemplary only. Proportional solenoid valves operating under other principles or incorporating other structures can also be used in accordance with the present invention.

The solenoid valve 75 opens or closes depending on the command signal from the CNC 12. The solenoid valve 75 is a simpler valve than the proportional solenoid valves 72, 73, 74. The solenoid valve 75 does not have the flat spring configuration described in the proportional solenoid valves 72, 73, 74 to enable proportional flow control. Instead, the solenoid valve 75 has two positions, an open position and a closed position. For example, when the command signal is at state zero, the solenoid valve 75 is closed. When the command signal is at state one, the solenoid valve 75 is open.

The output of the gasses passing through the PFC valves 72, 73, 74 and the solenoid valve 75 are monitored by the pressure transducers 76, 77 and this information is communicated to the CNC 12. If necessary, the CNC 12 adjusts the command signals provided to the PFC valves 72, 73, 74 and the solenoid valve 75, thereby creating a closed-loop dynamic relationship between the CNC 12 and the automatic process controller 16. This dynamic relationship improves the plasma cutting process by more accurately controlling the plasma gas and shield gas flow into the plasma arc torch 24.

The pressure information gathered by the pressure transducers 76, 77 can also be used in adjusting other process parameters. In one embodiment, the motion speed and profile within a cut program 600 (FIG. 16) is used to adjust the process parameters for the automatic process controller 16 and torch height controller 18. For example, during a corner cutting operation, where the torch 24 enters and exits a corner, the speed of the torch 24 must be decreased and then increased, respectively. During this corner cutting operation, the zone of reduced speed causes the arc to remove too much material from the work piece resulting in a wider kerf width, inaccurate finished part dimensions, and a reductions in consumable life. The CNC 12 can now use the knowledge contained within the cut program 600 regarding cut path and speed, and adjust gas flows using the automatic process controller 16. The adjustment in gas flow then dictates a change in the arc current level from the power supply 14 and a change in the torch height using the torch height controller 18. These adjustments further dictate a change in cut program's 600 cut path to compensate for the change in kerf width. The result is an integrated cutting process.

In one embodiment, the automatic process controller 12 includes a safety feedback feature. In one embodiment, the safety feedback feature monitors air pressure at the shield cap by routing the shield gas through an orifice 83 provided in the line 80 passing through the second manifold 71. The orifice 83 restricts the shield gas flow. If the cap is removed the pressure drop is then monitored by a pressure safety switch 78. The pressure safety switch 78 indicates that the shield cap has been removed by sensing the pressure at the cap. If the proper pressure is not maintained at the shield cap, the power supply 14 is disabled and an error message appears on the CNC display 13. This safety feedback feature ensures that the shield cap is in place prior to starting the power supply 14 or when the power supply 14 is in use. The first pressure transducer 76 and the second pressure transducer 77 also act as safety monitors to ensure proper gas flow. If proper gas flow is not maintained, the process can be shut down by the CNC 12.

Figure 11B:
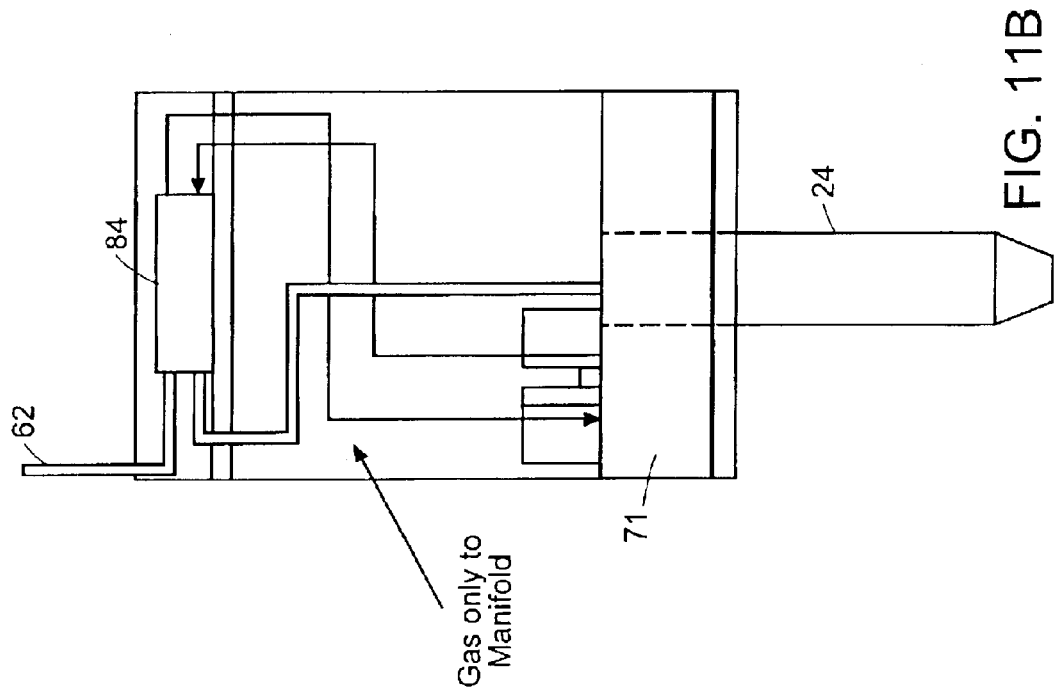
FIG. 11B is a schematic diagram of another side view of an automatic process controller according to one embodiment of the present invention.
Figure 11A:
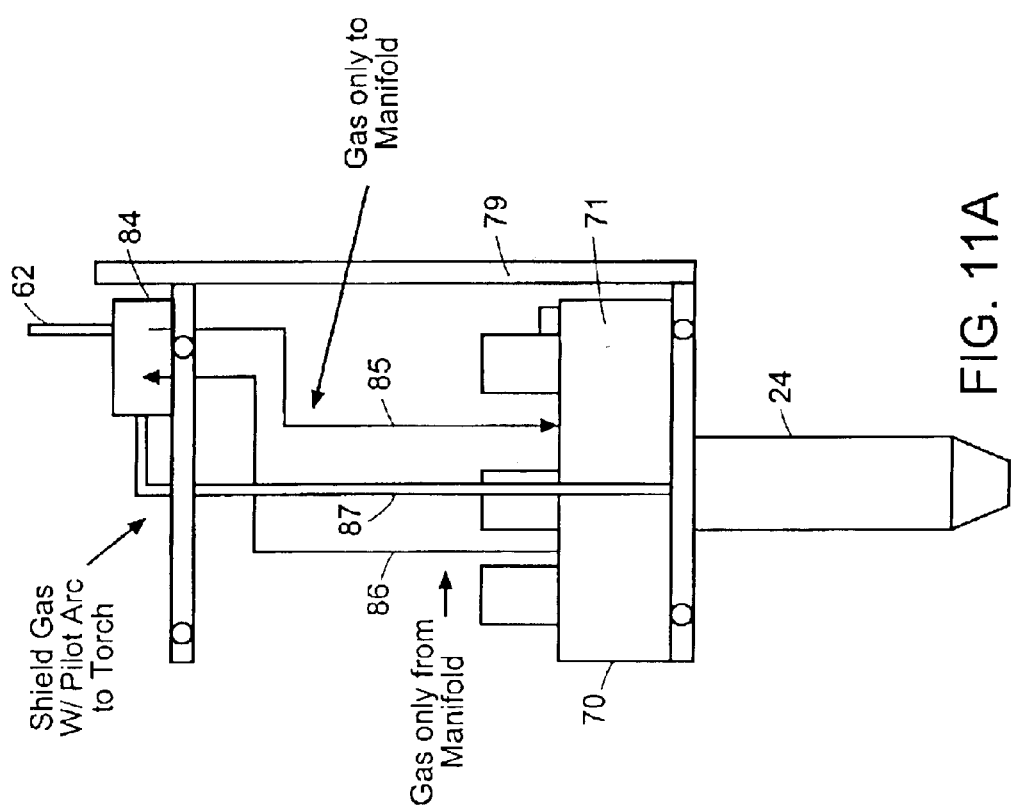
FIG. 11A is a schematic diagram of a side view of an automatic process controller according to one embodiment of the present invention.
Figure 12B:
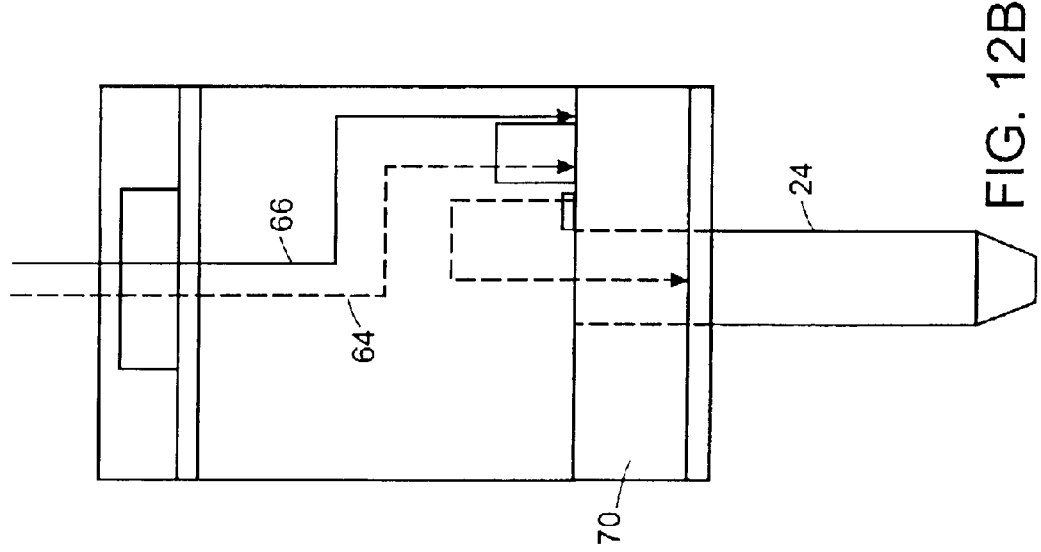
FIG. 12B is a schematic diagram of yet another side view of an automatic process controller according to one embodiment of the present invention.
Figure 12A:
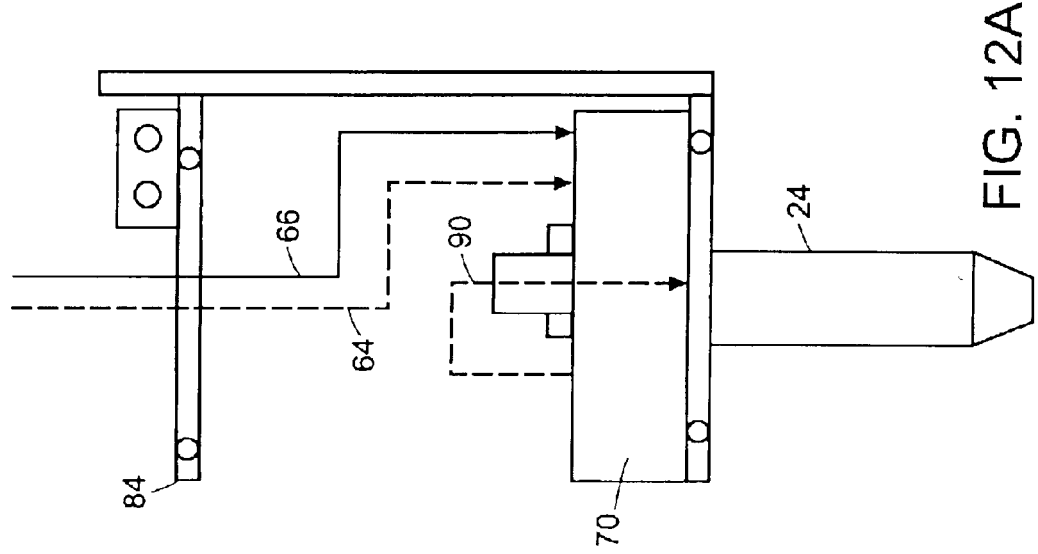
FIG. 12A is a schematic diagram of another side view of an automatic process controller according to one embodiment of the present invention.

In one embodiment, the automatic process controller 16 also includes a shield gas diverter manifold 84 shown in FIGS. 11A and 11B. The purpose of the shield gas diverter manifold 84 is to separate the shield gas from the pilot arc wire which are coupled in a line 62 extending from the power supply 14 shown in FIG. 6. The shield gas diverter manifold 84 is attached to the bracket 79. The bracket 79 is also attached to the shield gas manifold 71 and the cut gas manifold 70 of the automatic process controller 16. The shield gas diverter manifold 84 keeps the pilot arc wire away from the automatic process controller 16. Shield gas travels from the shield gas diverter manifold 84 to the automatic process controller 16 through line 85. The flow of shield gas is then adjusted in the shield gas manifold 71, and the adjusted shield gas is returned from the shield gas manifold 71 of the automatic process controller 16 to the shield gas diverter manifold 84 through line 86. The adjusted shield gas is then fed into one end of the torch lead 87 which also contains the pilot arc lead. The other end of the torch lead 87 is connected to the torch 24 for supplying the adjusted shield gas to the torch 24 as well as for placing the pilot arc lead into electrical contact with the torch nozzle. FIGS. 12A and 12B show a nitrogen line 64 and an oxygen line 66 supplying cut gas to the cut gas manifold 70. From the cut gas manifold 70, the cut gas is supplied to the torch 24 by line 90.

The automatic process controller 16 described herein provides several advantages. First, the cut quality is improved. The closed-loop execution of the cutting process based on monitoring the gas flow and controlling the gas flow based on continuous feedback improves cut quality. Automatic control, in contrast to manual control, of gas flow valves also improves accuracy. In addition, short leads from the manifolds 70, 71 to the plasma arc torch 24 provides nearly instantaneous response, further improving cut quality. Second, cycle time of the operation of the plasma arc system is reduced, since operator intervention is minimal and time for purging the gases is short due to reduced distance between the manifolds 70, 71 and the plasma arc torch 24. For example, typical plasma arc systems require purge time of several seconds in duration. The present invention, on the other hand, can establish a stable gas condition in less than about 200 milliseconds. By establishing a stable gas condition in a shorter period of time, the automatic process controller improves consumable life by minimizing unstable gas conditions. Third, the automatic process controller includes safety features. For example, the present invention prevents ignition of the plasma arc if there is insufficient gas flow, and generates an error message on the CNC display to alert the user. The present invention also disallows out-of-tolerance flow conditions, allowing the CNC to safely shut down the system without damaging the consumables of the plasma torch.

Torch Height Control

The purpose of a torch height controller 18 is to provide an optimum voltage for a desired metal cutting process. There is a direct relationship between cut voltage and a standoff. The standoff refers to the gap between the metal work surface and the torch electrode.

Figure 13:
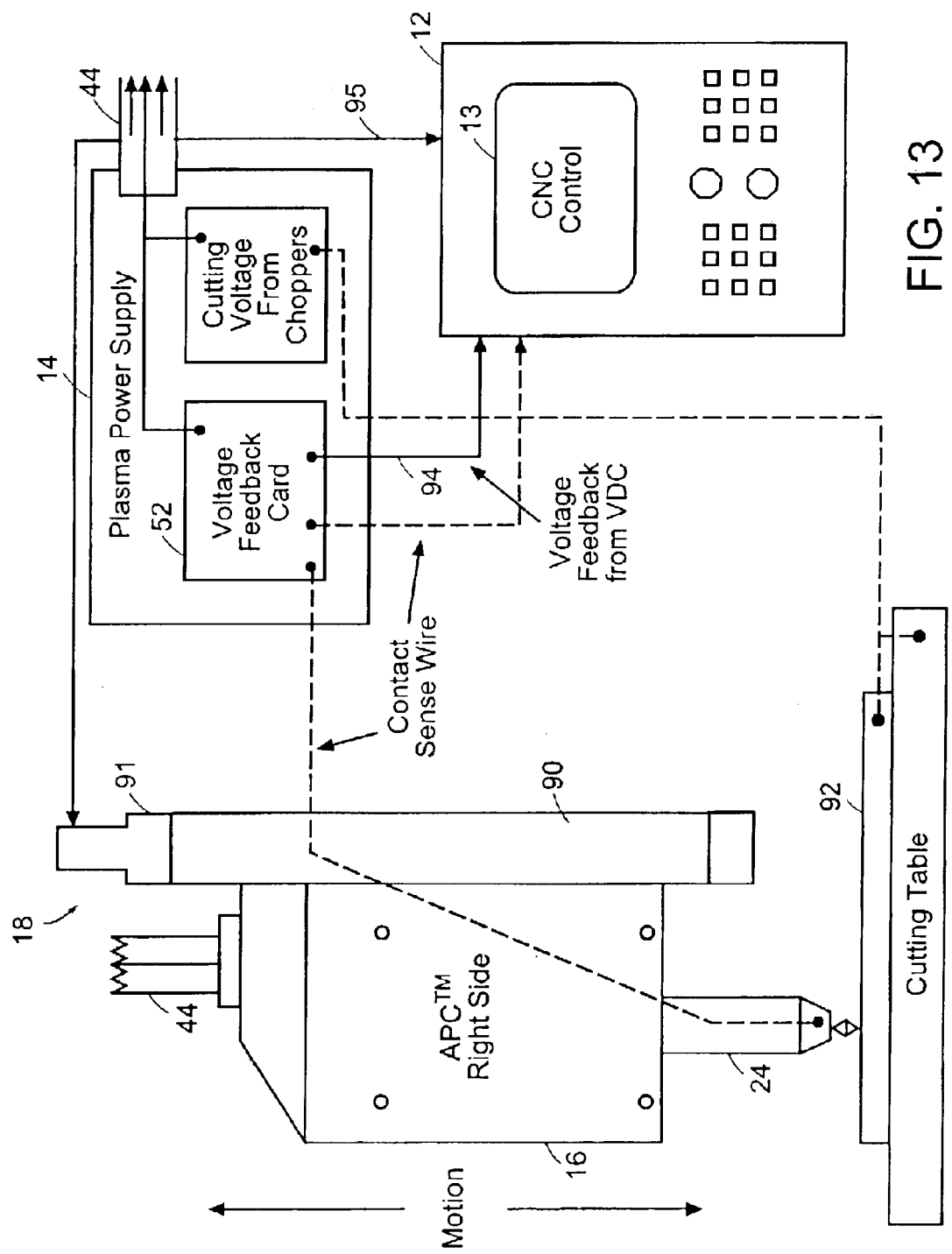
FIG. 13 is a schematic diagram illustrating an interaction between a torch height controller, a power supply and a CNC according to one embodiment of the present invention.
Figure 14:
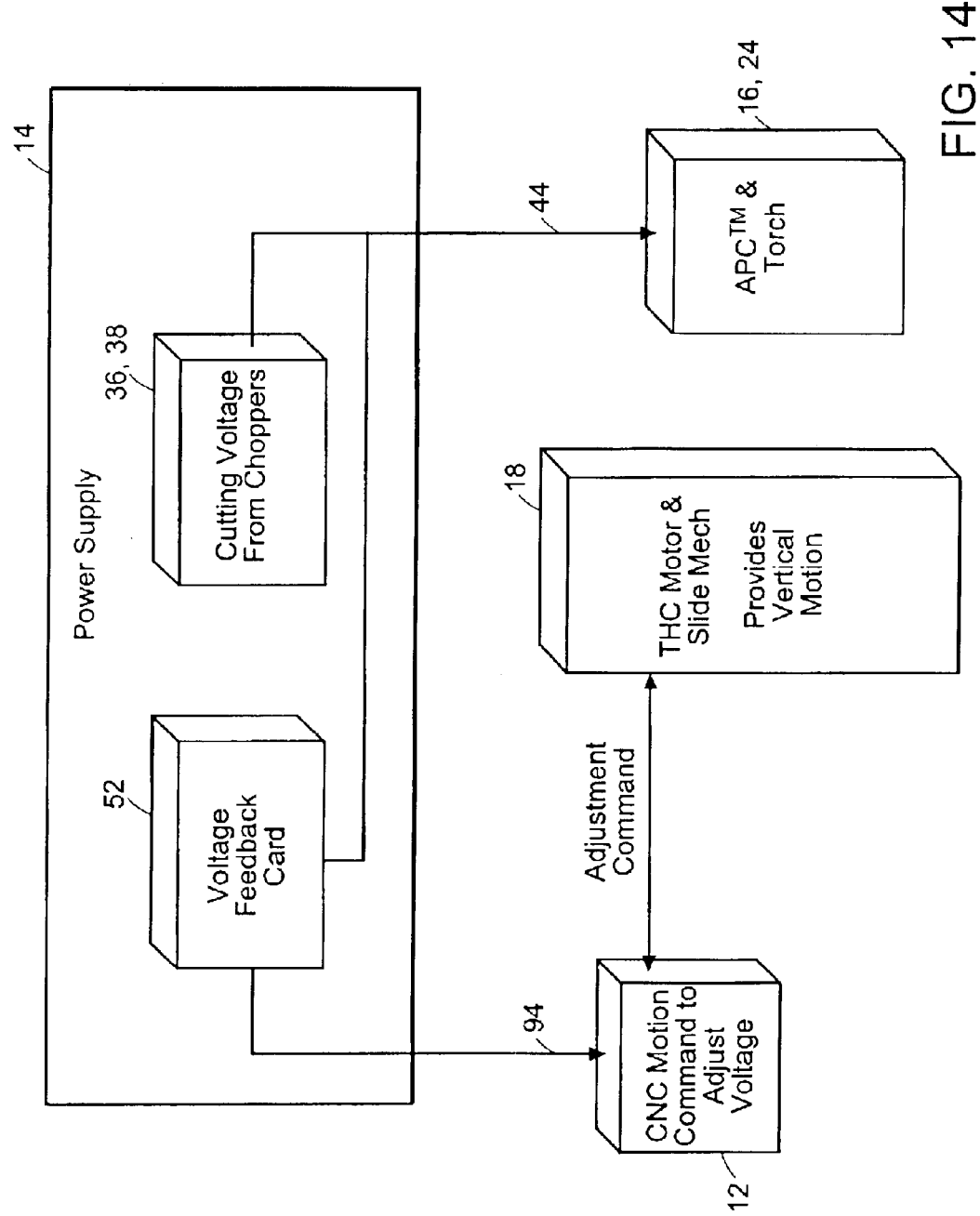
FIG. 14 is a block diagram illustrating a torch height controller according to one embodiment of the present invention.

Referring to FIGS. 13 and 14, the torch height controller (THC) 18 includes a mechanical slider or lifter 90 driven by a motor 91. The motor 91 is in electrical communication with the CNC 12. The plasma arc torch 24 is attached to the slider 90. An encoder provided inside the motor 91 is in electrical communication with the CNC 12. The encoder provides location information from the slider 90 back to the CNC 12. The torch 24 is in electrical communication with the voltage feedback card 52 provided inside the power source 14 and the CNC 12 to provide voltage information to the CNC 12. The CNC 12 uses the location information provided by the encoder, and voltage information provided by the voltage feedback card 52, in conjunction with a desired work piece cut path programmed into the CNC 12, to provide an input signal to the motor 91 to change the standoff.

To start the cutting process, the CNC 12 lowers the torch 24 until contact is made with a work piece 92. Once the torch 24 contacts the work piece 92, a signal is sent from the voltage feedback card 52 to the CNC 12 to indicate the position of the work piece 92.

After the torch 24 has contacted the work piece 92, the torch 24 is retracted to a pierce height as determined by the CNC 12. After the pilot arc in the torch 24 has transferred to a cutting arc, a signal 94 is sent from the voltage feedback card 52 to the CNC 12 allowing the CNC 12 to control the motion of the torch height controller 18.

The voltage feedback card 52 reduces the voltage read at the torch 24 by a ratio, which for example can be 40:1, to provide a low voltage signal 94 to the CNC 12. The CNC 12 then multiplies the reduced voltage by the inverse of the ratio of voltage reduction used in the voltage feedback card 52 to determine the exact cutting arc voltage. If the cutting arc voltage is not at a set voltage as determined by the CNC 12, based on a given part cutting program, the CNC 12 will send a signal 95 to the motor 91 to adjust the torch height controller 18 up or down to adjust the voltage. If the THC 18 is unable to respond to a command 95 from the CNC 12, or the cutting voltage is outside of set voltage tolerances programmed into the CNC 12, the CNC 12 will stop the present operation and post a fault message to the operator on a CNC display screen 13.

At the end of a cut segment, the torch 24 will be raised to travel over obstacles before beginning the initial pierce cycle for the next work piece, as the torch 24 can be programmed to be raised between work pieces. If the travel distance to the next part is short, as determined by the user, the full retraction and initial plate sensing may be bypassed allowing immediate positioning of the THC 18 at a pierce height and voltage to begin the next cutting cycle. This feature significantly improves the overall process time for cutting separate work pieces 92 on a plate.

In operation, if the torch 24 passes over an area on the plate where there is no metal, for example off the edge of a work piece 92, the CNC 12 will detect a large voltage spike. In response to the voltage spike, the CNC 12 will prevent motion of the THC 18 to prevent the THC 18 from driving the torch 24 into the workpiece 92.

In areas where the motion profile for a workpiece 92 is very intricate, for example sharp angles or curves, the torch motion will slow down. This slow down in torch motion causes more metal to be removed along the cut path which results in a wider cut path and increased voltage. The CNC 12 will prevent motion of THC 18 in areas with intricate motion profiles to prevent the THC 18 from driving the torch 24 into the workpiece 92.

In the event of a loss of the cutting arc, the loss is detected by the CNC 12 from a signal sent by the voltage feedback card 52, and the CNC 12 halts the cutting process and sends an error message to the operator on the display screen 13 of the CNC 12.

The CNC Programs

Figure 15:
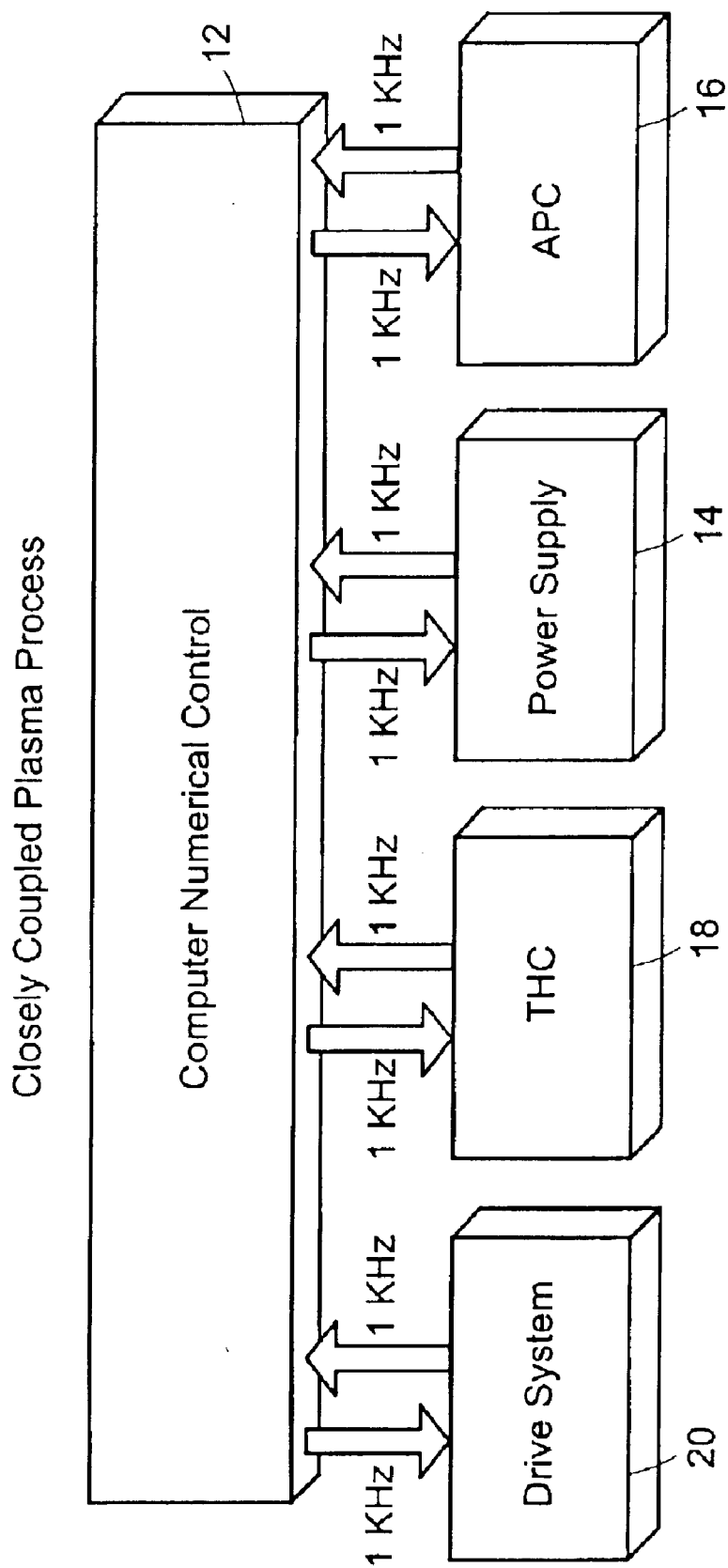
FIG. 15 is a flow chart illustrating a closely-coupled plasma process according to one embodiment of the present invention.
Figure 16:
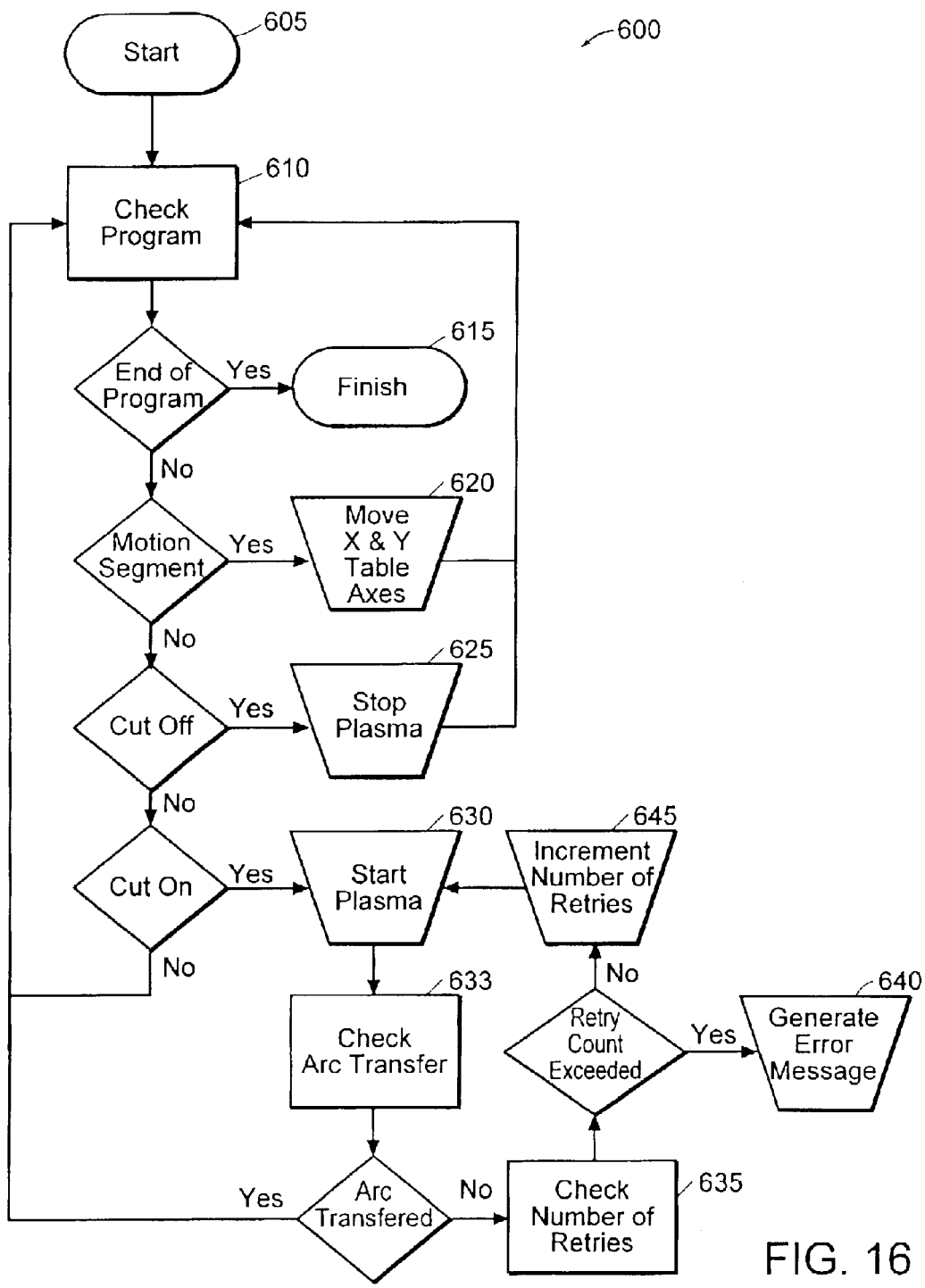
FIG. 16 is a flow chart illustrating a part program execution according to one embodiment of the present invention.

Upon receiving the user input to initiate the plasma arc system and generating all the parameters necessary to start the operation of the plasma arc system, the CNC 12 provides command signals to and receives feedback signals from each of the drive system 20, the torch height controller 18, the power supply 14 and the automatic process controller 16 as illustrated in FIG. 15. The CNC executes the routines illustrated in FIGS. 16–20. For example, the CNC performs these routines at 1 millisecond intervals for as long as the system is in operation.

The CNC executes the part program to provide information to the closely-coupled plasma arc system 10 for cutting a desired shape in a workpiece. Referring to the flow chart shown in FIG. 16, upon receiving the start command (step 605), the CNC 12 checks a cut program to determine if the cut program has been completed (step 610). If all the operations are completed, the program ends (step 615). If the cut program is not completed, the CNC 12 then checks the motion segment of the cut program to determine if the gantry and torch must be moved. If the gantry and torch must be moved, the CNC 12 provides a command to move the gantry and torch (step 620), and then the CNC 12 returns to check program (step 610) to determine if the cut program has been completed. If the gantry and torch do not have to be moved, the CNC 12 then determines if the plasma arc must be cut off. If the plasma arc must be cut off, the CNC 12 provides a command to stop the plasma arc (step 625) and then the CNC 12 returns to check program (step 610) to determine if the cut program has been completed. If the plasma arc does not have to be cut off, the program then checks to see if the plasma arc has to be started. If the plasma arc does not have to be started, the CNC 12 returns to check program (step 610) to determine if the cut program has been completed. If the plasma arc has to be started, the CNC 12 provides a command to start the plasma arc (step 630), and checks for arc transfer from the pilot arc to the work piece 633. If the arc has transferred to the work piece, the CNC 12 returns to the check program (step 610) to determine if the cut program has been completed. If the pilot arc does not transfer, the CNC 12 checks the number of retries (step 635). If the number of retry counts has been exceeded, an error message is displayed on the CNC display (step 640). If the number of retries has not been exceeded, the number of retries is incremented (step 645) and the plasma arc start (step 635) is retried.

Figure 17:
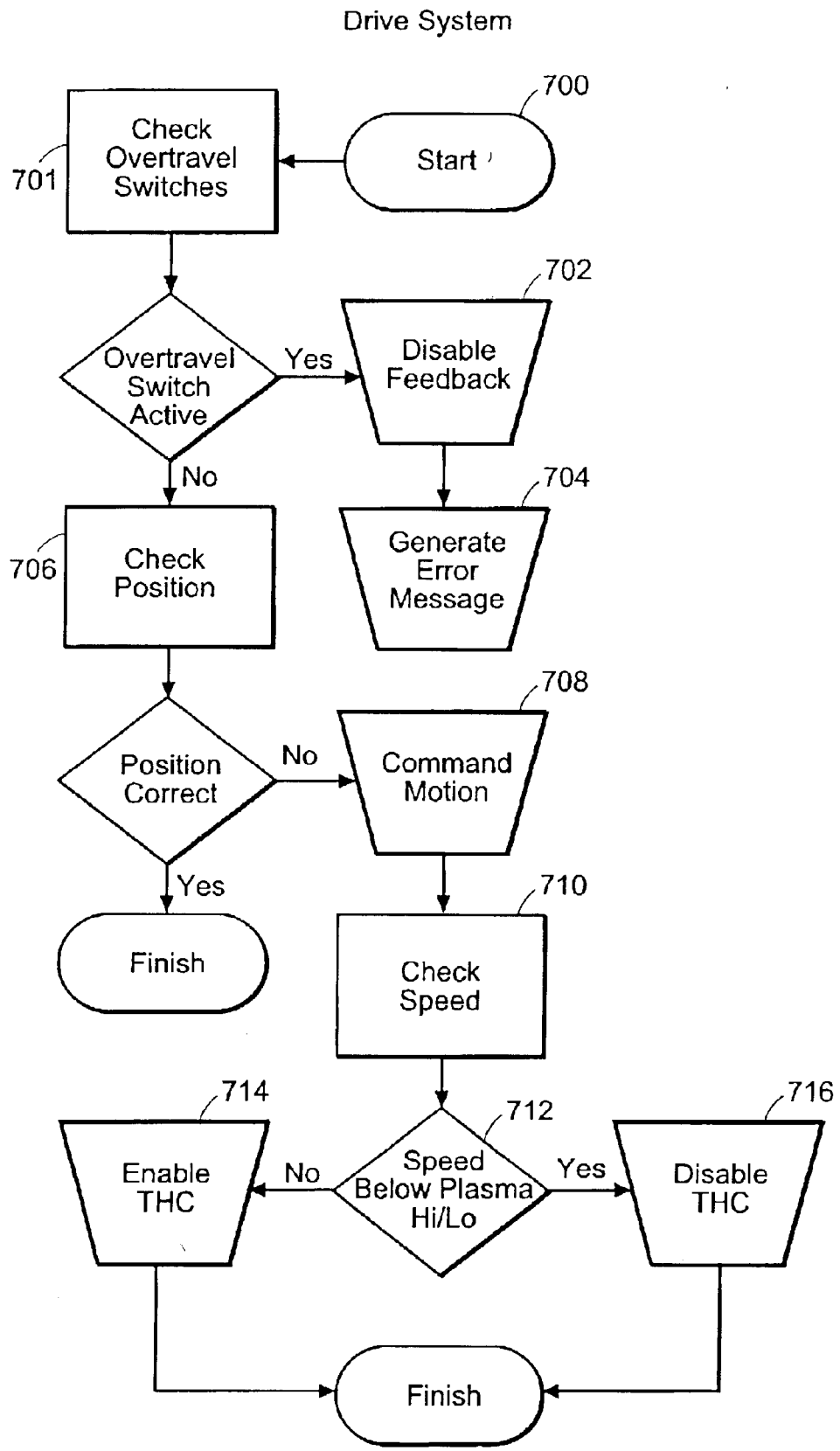
FIG. 17 is a flow chart illustrating control of a drive system according to one embodiment of the present invention.

The CNC 12 executes a routine illustrated in FIG. 17 for operating the drive system. Referring to the flow chart shown in FIG. 17, upon receiving the start command (step 700), the CNC 12 checks the overtravel switches located at each end of the gantry and the rail (step 701). If the overtravel switches are active, then a feedback signal is provided to the CNC 12 to disable the system 10 (step 702) and to generate an error message on the display 13 of the CNC 12 (step 704). If the overtravel switches are not active, the CNC checks the position of the torch 24 and the gantry 26 using an encoder in a servo loop with the motors (step 706). If the position is accurate, a single run through the routine for the driver system 20 is complete. If the position is incorrect, the CNC 12 provides a command signal to the driver system 20 to move the gantry 26 and/or the torch 24 (step 708). The CNC 12 checks the speed of the torch system (step 710). If the speed is above plasma hi/lo, above a user defined speed, for example 90% of a design speed (step 712), then the torch height controller 18 is enabled (step 714) and the routine is complete. If the speed is below the user defined speed, the torch height controller 18 is disabled (step 716) and the routine is complete. The CNC 12 repeats the routine for the drive system 20 for as long as the plasma system is in operation.

Figure 18:
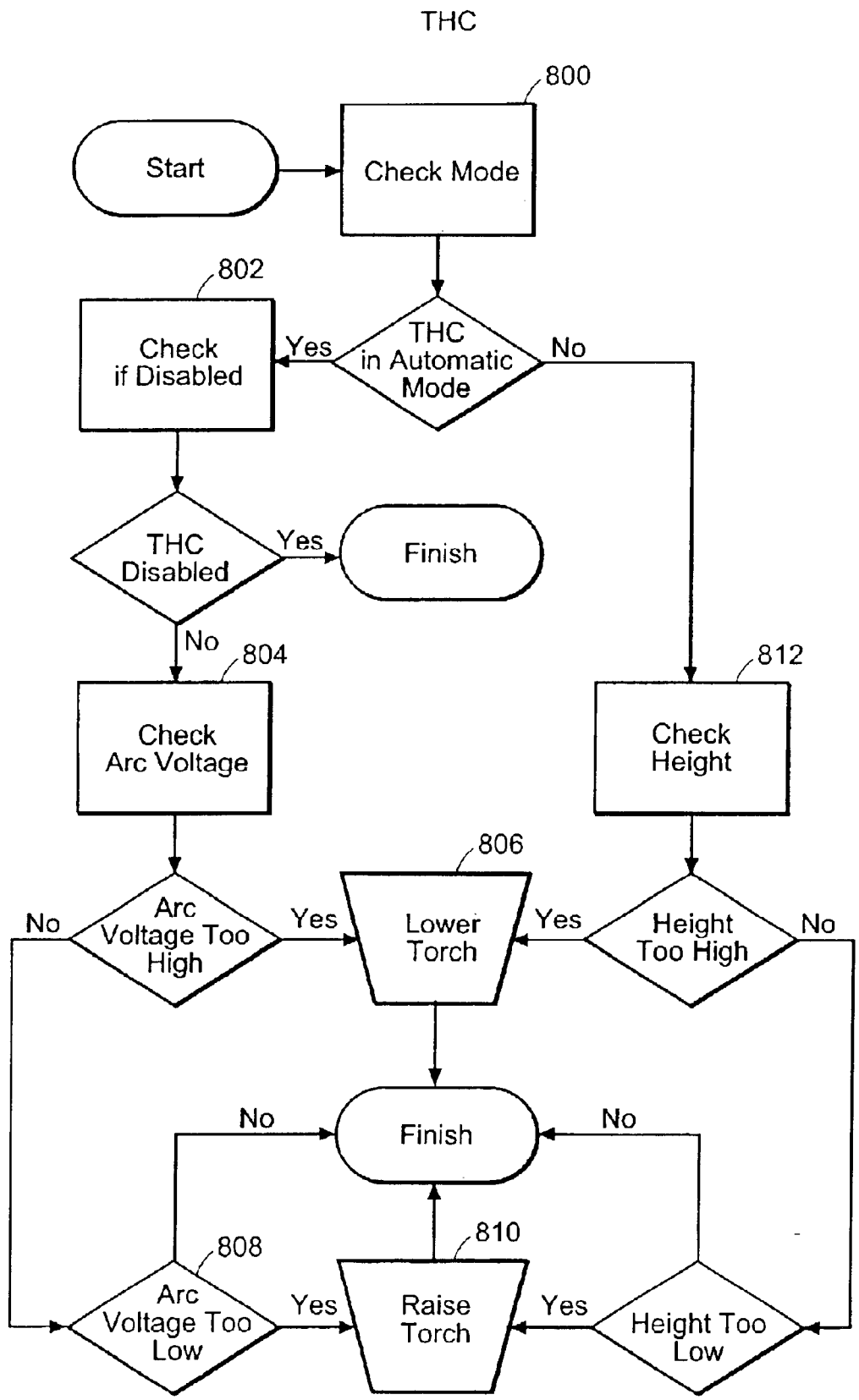
FIG. 18 is a flow chart illustrating control of a torch height control according to one embodiment of the present invention.

The CNC 12 executes a routine illustrated in FIG. 18 for operating the torch height controller 18. Upon receiving a start signal, the CNC 12 checks the operation mode (step 800). If the operation mode is in automatic mode, the CNC 12 checks to see whether the torch height controller 18 is disabled (step 802). If the torch height controller 18 is disabled, the routine is complete. If the torch height controller is not disabled, the CNC 12 checks the arc voltage (step 804). If the arc voltage is too high, the torch height controller 18 lowers the plasma arc torch 24 (step 806) and the routine is complete. If the arc voltage is not too high, the CNC 12 checks the arc voltage to determine whether the arc voltage is too low (step 808). If the arc voltage is not too low, then the routine is complete. If the arc voltage is too low, then the torch height controller 18 raises the plasma arc torch 24 (step 810) and the routine is complete. If the torch height controller 18 is not in the automatic mode (step 800), then the CNC 12 sets the torch height by raising the torch as high as possible to a known location, and then the torch is lowered to touch the work piece. Then the torch is raised to a desired location and the torch height is checked (step 812). If the torch height is too high, then the torch height controller lowers the plasma arc torch 24 (step 806) and the routine is complete. If the torch height is not too high, then the CNC 12 checks to see whether the torch height is too low. If the torch height is not too low, then the routine is complete. If the torch height is too low, then the torch 24 is raised (step 810) and the routine is complete. The CNC 12 repeats the routine for the torch height controller 18 for as long as the plasma arc system 10 is in operation.

Figure 19:
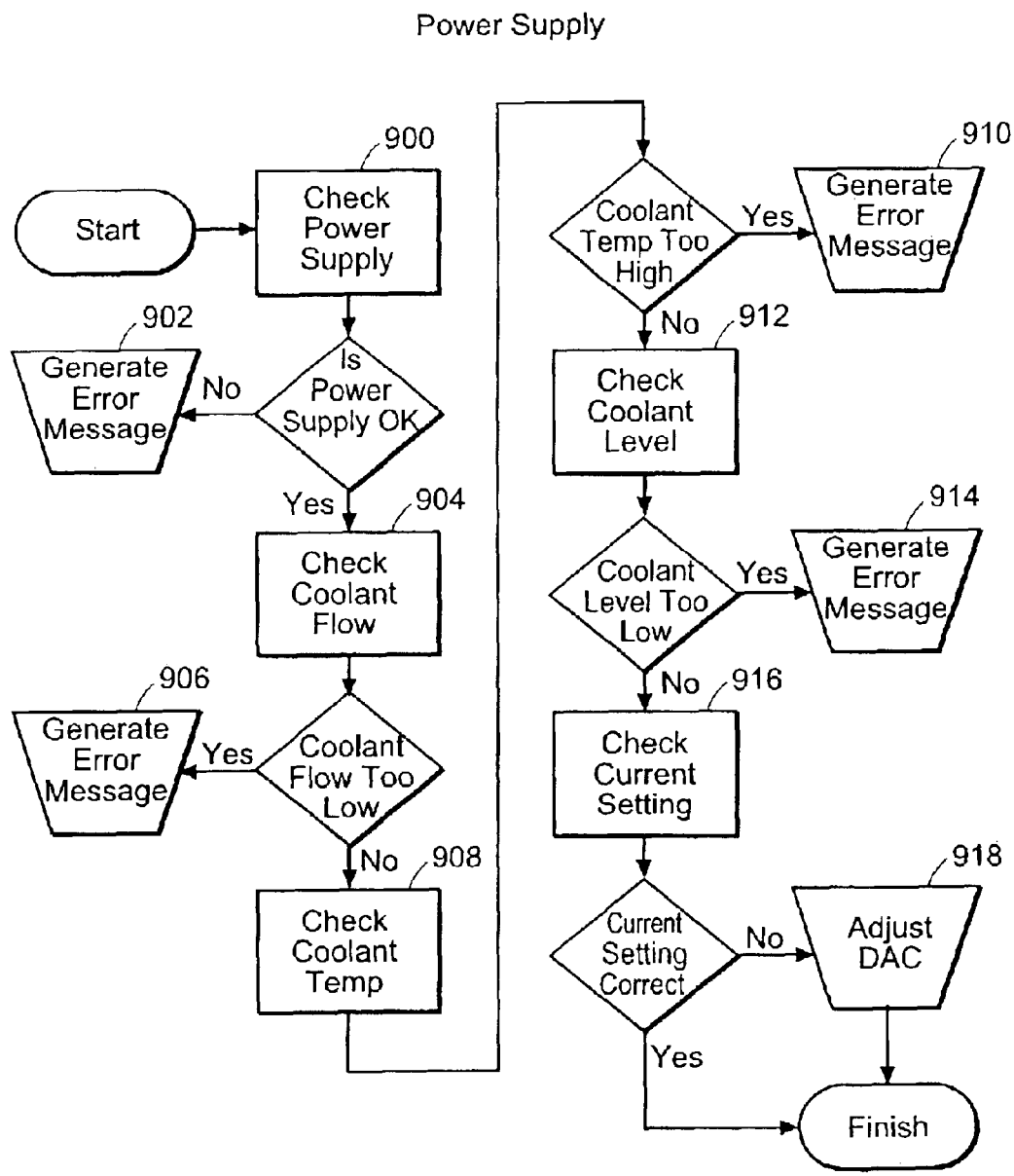
FIG. 19 is a flow chart illustrating control of a power supply according to one embodiment of the present invention.

The CNC 12 operates the power supply 14 by executing the routine shown in FIG. 19. The CNC 12 checks the status of the power supply 14 (step 900). If the power supply 14 does not have a ready condition, the CNC 12 generates an error message (step 902). If the power supply 14 does have a ready condition, the CNC 12 moves on to check coolant flow error (step 904). If the coolant flow is too low, then the CNC 12 generates an error message (step 906). If the coolant flow is sufficient, the CNC 12 checks the coolant temperature (step 908). If the coolant temperature is too high, the CNC 12 generates an error message (step 910). If the coolant temperature is sufficient, the CNC 12 checks the coolant level (step 912). If the coolant level is too low, the CNC 12 generates an error message (step 914). If the coolant level is sufficient, the CNC 12 checks the current setting (step 916). If the current setting is incorrect, the CNC 12 sends a command signal to adjust digital to analog converter located in the controller to send an analog signal to the chopper (step 918). If the current setting is correct, the routine is complete. The CNC 12 repeats the routine for controlling the power source.

Figure 20:
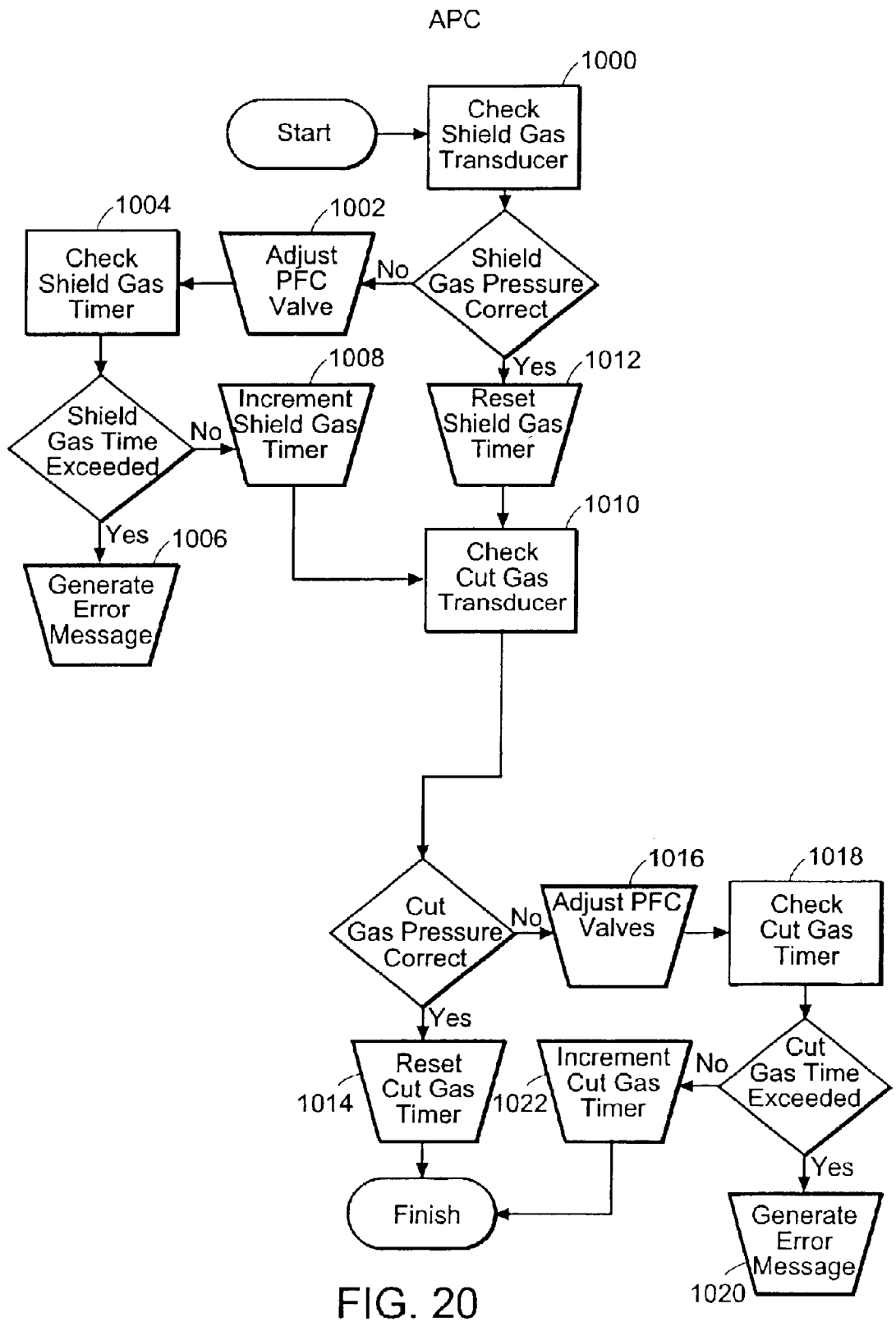
FIG. 20 is a flow chart illustrating control of automatic process control according to one embodiment of the present invention.

The CNC 12 controls the operation of the automatic process controller 16 by executing the routine shown in FIG. 20. The CNC 12 checks the pressure of the pressure transducer for the shield gas (step 1000). If the shield gas pressure measured at the transducer is incorrect, the CNC 12 generates and applies a command signal to adjust the PFC valve 74 (shown in FIG. 8) for the shield gas (step 1002). The CNC 12 checks the shield gas timer located in the CNC 12 (step 1004) and if the shield gas timer has been exceeded, the CNC 12 generates an error message (step 1006). If the shield gas timer has not been exceeded, the CNC 12 increments the shield gas timer because a fault condition has not been encountered (step 1008). The CNC 12 moves on to check the cut gas pressure (step 1010). If the shield gas pressure is correct, the CNC 12 resets the shield gas timer (step 1012). After resetting the shield gas timer, the CNC 12 checks the cut gas pressure (step 1010) to determine if cut gas pressure is correct. If the cut gas pressure is correct, the CNC 12 resets the cut gas timer (step 1014) and the routine is complete. If the cut gas pressure is incorrect the CNC 12 adjusts PFC valves 72, 73 in the cut gas manifold 70 (step 1016). After adjusting the PFC valves 72, 73 in the cut gas manifold 70, the CNC 12 checks the cut gas timer (step 1018). If the cut gas time has been exceeded, the CNC 12 generates an error message (step 1020). If the cut gas timer has not been exceeded, the CNC 12 increments the cut gas timer (step 1022) and the routine for controlling the APC 16 is complete. The CNC 12 repeats the routine for controlling the APC 16 during the entire operation of the torch to control the cut gas flow and the shield gas flow.

Laser Applications

Up to this point in the specification the CNC 12, the power supply 14, the automatic process controller 16, the torch height controller 18 and the CNC programs have all been described with respect to plasma arc systems. As will be described in more detail below, these same components can also be used in material processing systems, where the systems dispense a laser beam to process the workpiece. The power supply can be a light source to generate a laser beam and the torch height control can be a laser height control to set the height of the laser with respect to the workpiece.

Light Source Monitor

As shown in the drawings for the purposes of illustration, a system according to the invention monitors the processing of a workpiece in an industrial environment. The system serves as an on-line cut monitor system that is insensitive to cutting direction and operates in near real-time to provide a reliable indication of cut quality. Measurement of the temperature of the cutting front has been found to be a generally reliable indicator of cut quality. More specifically, when a clean cut is being produced under optimal conditions, the average cut face temperature is relatively constant. Significant deterioration in cut quality, e.g., the presence of excessive dross, uneven kerf width, or rough cut edges are typically accompanied by variations in the cut face temperature. The system according to the invention is capable of detecting a gross change in the average temperature and irregular fluctuations in temperature of varying amplitude and frequency. In particular, the system measures light intensity at two spectral bands. The measured intensities are processed (e.g. a ratio of the spectral bands is determined) and the results are used in conjunction with a lookup table to ascertain a cut-quality in real-time. In addition, remote sensing of the temperature relative to a laser beam has been found to be advantageous.

Figure 21:
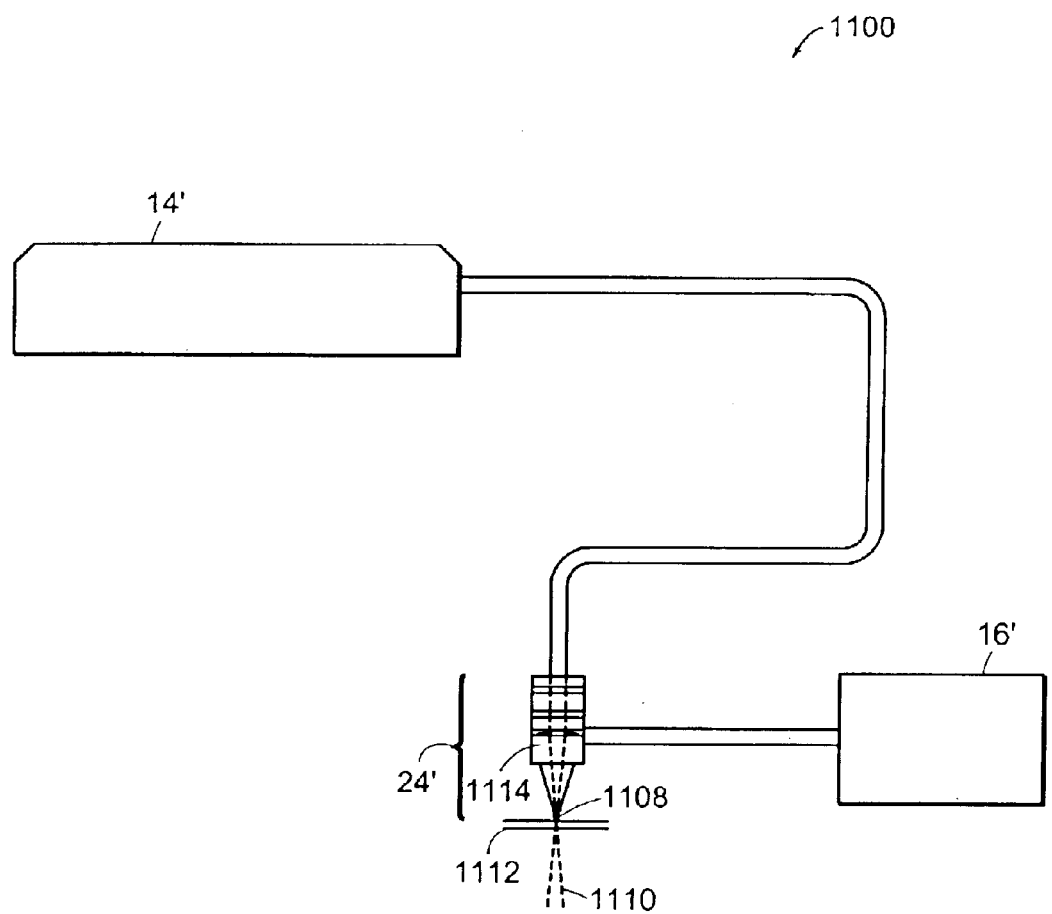
FIG. 21 is a block diagram of a material processing apparatus in accordance with an embodiment of the present invention.

FIG. 21 shows a schematic sectional view of an embodiment of a material processing system 1100. A material processing stream source 14' generates a material processing stream 1110 and delivers it to a processing head assembly 24'. An automatic process controller 16' supplies a fluid, such as an assist gas, to the processing head assembly 24'. A chamber 1114 receives a fluid supplied by the automatic process controller 16'. A nozzle 1108 is also disposed within the processing head assembly 24'. The material processing stream 1110 and fluid from the automatic process controller pass through chamber 1114 and the nozzle 1108 and impinge on a workpiece 1112 to cut, weld, heat treat, or otherwise modify the workpiece 1112.

In one embodiment, the material processing stream source 14' is a plasma source and the material processing stream 1110 is a plasma. In another embodiment, the material processing stream source 14' is a laser and the material processing stream 1110 is a laser beam. In the plasma source embodiment, the chamber 1114 can be a plasma chamber. In the laser source embodiment, the chamber 1114 can be a plenum.

Figure 22:
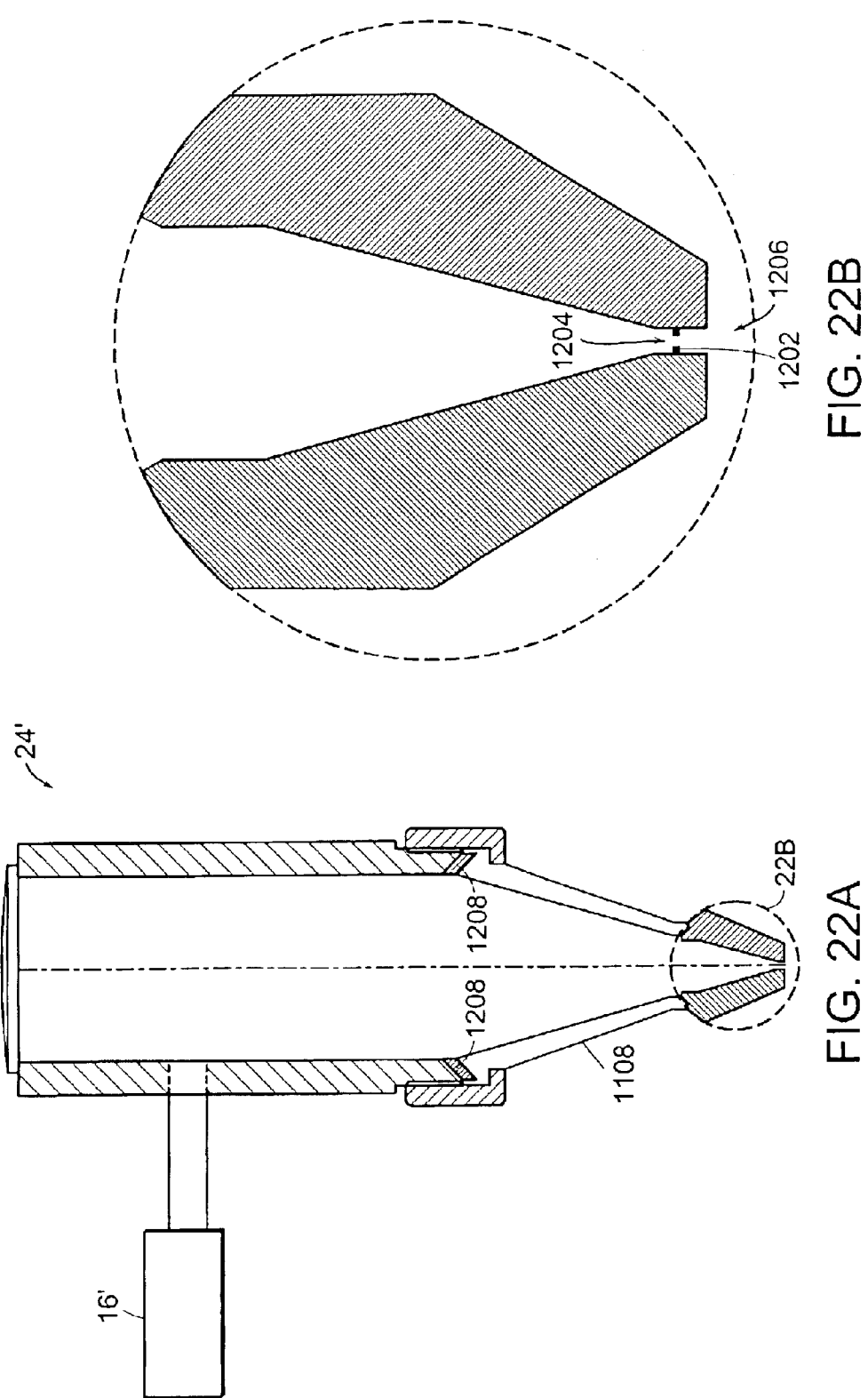
FIG. 22A is a schematic sectional view of a processing head assembly in accordance with an embodiment of the present invention.
FIG. 22B is a close-up schematic sectional view of a nozzle in accordance with an embodiment of the present invention.

FIG. 22A illustrates additional details of the processing head 24' and the nozzle 1108. FIG. 22B provides a close-up view of a portion of the nozzle 1108. The nozzle includes a central exit orifice 1206. In some embodiments, a baffle 1202 is disposed relative to the nozzle 1108. The baffle 1202 includes an opening 1204 that is perpendicular to an axis of propagation of the material processing stream 1110 and substantially coincident with the central exit orifice 1206.

The "working end" of the processing head assembly 24' is that portion closest to the workpiece 1112. The working end typically degrades from use because of its direct exposure to the extreme conditions present on the workpiece 1112 during material processing. These conditions include, for example, high temperature and a local atmosphere of highly reactive gas.

In one embodiment, the axis of the nozzle 1108 is aligned with an axis of the processing head assembly 24'. This ensures the material processing stream 1110 is centered in the central exit orifice 1206 as it passes through en route to the workpiece 1112. To maintain alignment, the nozzle 1108 can have surfaces 1208 that are contoured over a predetermined axial extent. The contoured surfaces 1208 mate with adjacent structure of the processing head assembly 24'. This mating action results in the coaxial alignment of the nozzle 1108 and the processing head assembly 24', thereby improving accuracy and cut quality and extending the operational life of the working end of the assembly 1104.

Figure 23:
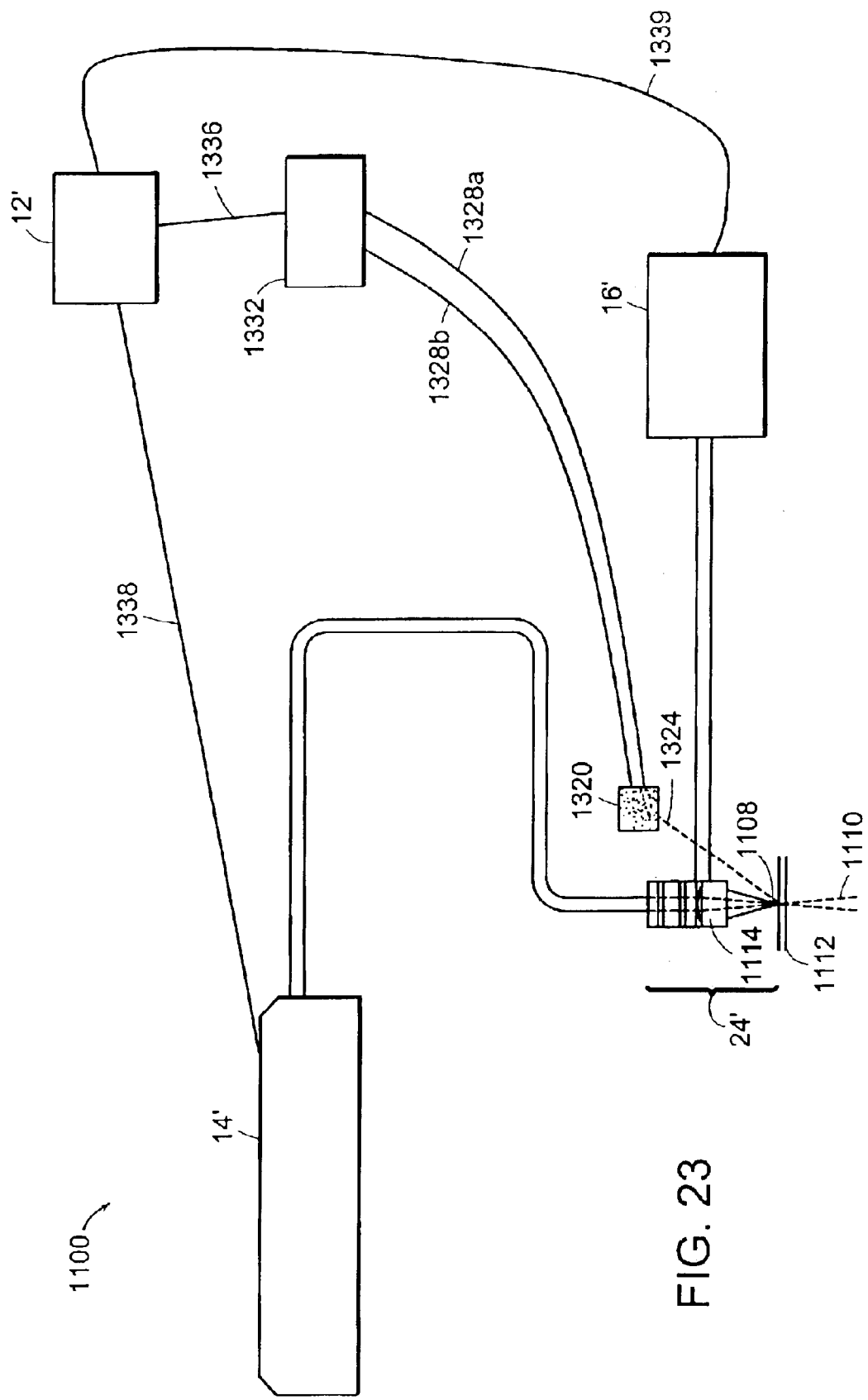
FIG. 23 is a block diagram of a material processing apparatus comprising a light source monitor in accordance with an embodiment of the present invention.

Referring now to FIG. 23, in another embodiment of the invention, the material processing system 1100 includes a CNC 12', such as the CNC 12 of FIG. 2. The CNC 12' communicates with a light source monitor 1332 via a cable 1336, as will be described below, to obtain information about cut quality. In another embodiment, the CNC can function as a light source monitor. An optical detector 1320 is used to measure a signal 1324 that is emitted by the workpiece 1112. The signal 1324 is emitted by the workpiece in response to the material processing stream 1110 that impinges upon the workpiece 1112. In one embodiment, the signal 1324 can be an emission. The optical detector 1320 generates an output 1328 based upon the signal 1324 measured by the optical detector 1320. In one embodiment, the optical detector 1320 is a silicon photodiode two color detector, model no. PIN-44DP, sold by UDT Sensors, Inc., located in Hawthorne, Calif. The output 1328 is provided to a light source monitor 1332. In one embodiment, two optical detectors 1320 can be used, where each detector is sensitive to different frequency ranges of the signal 1324. The output of the two optical detectors in response to a first wavelength range 1328a and a second wavelength range 1328b are electrical signals transmitted to the light source monitor 1332 via wires. In another embodiment, two optical detectors 1320 can be replaced by one sandwich detector, which detects two ranges of wavelengths. In one embodiment, the sandwich detector can be a sandwich detector, model no. PIN-DSS, sold by UDT Sensors, Inc., located in Hawthorne, Calif.

The light source monitor 1332 determines the quality of the processing being performed on the workpiece 1112 based upon the outputs 1328a and 1328b. In addition, the light source monitor 1332 can provide a signal via cable 1336 to the CNC 12', which can be used to control the output of the material processing stream source 14' via a cable 1338. In addition, the CNC 12' can also provide a signal to the automatic process controller 16' via cable 1339 to adjust the amount of fluid supplied to the processing head assembly 24'. In one embodiment, the light source monitor 1332 can be a stand alone microprocessor. In another embodiment, the light source monitor can be a computerized numeric controller sold by Hypertherm Automation, located in West Lebanon, N.H.

To determine the quality of the processing being performed on the workpiece 1112, the apparatus uses two-color pyrometry to evaluate the signal 1324 emitted from the workpiece 1112 in response to the material processing stream 1110. Two-color (i.e., two wavelengths of light) pyrometry involves the calculation of the radiant light intensity in discrete, narrow spectral bands. The system measures the radiant light intensity to determine the relative temperature of the kerf being formed by the head assembly (e.g., the cut zone).

Mathematically, the radiant light intensity of a black body over a narrow band of wavelength $d\lambda$ centered around the wavelength $\lambda$, is given by:

$$S_\lambda d\lambda = \frac{2\pi c^2 h}{\lambda^5} \frac{1}{e^{hc/kT\lambda} - 1} d\lambda, \quad (1)$$

where c is the speed of light, h is Planck's constant, k is Boltzmann's constant and T is the temperature of the blackbody. The ratio of the intensities detected at two different wavelengths, $\lambda_1$ and $\lambda_2$ is:

$$\text{Intensity Ratio} = \frac{S_{\lambda_2} d\lambda_2}{S_{\lambda_1} d\lambda_1} = \frac{e^{hc/kT\lambda_1} - 1}{e^{hc/kT\lambda_2} - 1} \left(\frac{\lambda_1}{\lambda_2}\right)^5 \frac{d\lambda_2}{d\lambda_1}. \quad (2)$$

If the two wavelength band widths are equal (i.e., if the light is filtered by two narrow bandpass filters of equal bandwidth $d\lambda = d\lambda_1 = d\lambda_2$), and the two wavelengths are fixed, the Intensity Ratio becomes:

$$\text{Intensity Ratio} \approx \left(\frac{\lambda_1}{\lambda_2}\right)^5 e^{hc/kT(\lambda_2 - \lambda_1)/\lambda_1 \lambda_2} = C_1 e^{C_2/T}, \quad (3)$$

where $C_1$ and $C_2$ are constants. For the case $\lambda_2 > \lambda_1$, $C_2$ is a positive constant, implying that the Intensity Ratio is a monotonically decreasing function of temperature, i.e., a lower Intensity Ratio indicates a higher relative temperature. Thus, the Intensity Ratio is a function of the temperature of the radiating body, which in this case is the temperature of the cut zone.

Advantages of this processing technique become evident when considering the circumstances under which overcombustion or non-penetrating cutting conditions occur during material processing. In both these cases, the radiant light intensity signals ($S_{\lambda_1}$ and $S_{\lambda_2}$) rise in magnitude above their values calculated during clean cutting conditions; however, their ratio increases for the overcombustion cutting condition and the ratio decreases for the non-penetrating cutting condition. For the non-penetrating cutting condition, the radiant light intensity emitted by the workpiece increases as the temperature of the workpiece increases, thereby leading to an increase in the radiant light intensity signals ($S_{\lambda_1}$ and $S_{\lambda_2}$) and a decrease in the Intensity Ratio according to Eqn. (3). For the overcombustion cutting condition, the temperature of the workpiece drops and the Intensity Ratio increases. In addition, the overcombustion cutting condition generally results in a wider kerf. Due to the wider kerf "visible" to the receiver, the magnitude of the light level incident upon the detectors is large, which causes both of the radiant light intensity signals ($S_{\lambda_1}$ and $S_{\lambda_2}$) to increase. If a single wavelength detection scheme was used, the light source monitor would be unable to distinguish an overcombustion cutting condition from a non-penetrating cutting condition. Further, employing the two wavelength ($S_{\lambda_1}$ and $S_{\lambda_2}$) processing technique for determining cutting quality and assuming a specific material composition and thickness (e.g., 12.7 mm steel), the optimal range for the Intensity Ratio is, generally, independent of average laser power and the exit diameter of the nozzle. This is an advantage in that the light source monitor 1332 could be used in different material processing system installations without requiring an operator to determine custom operating parameters.

Figure 26:
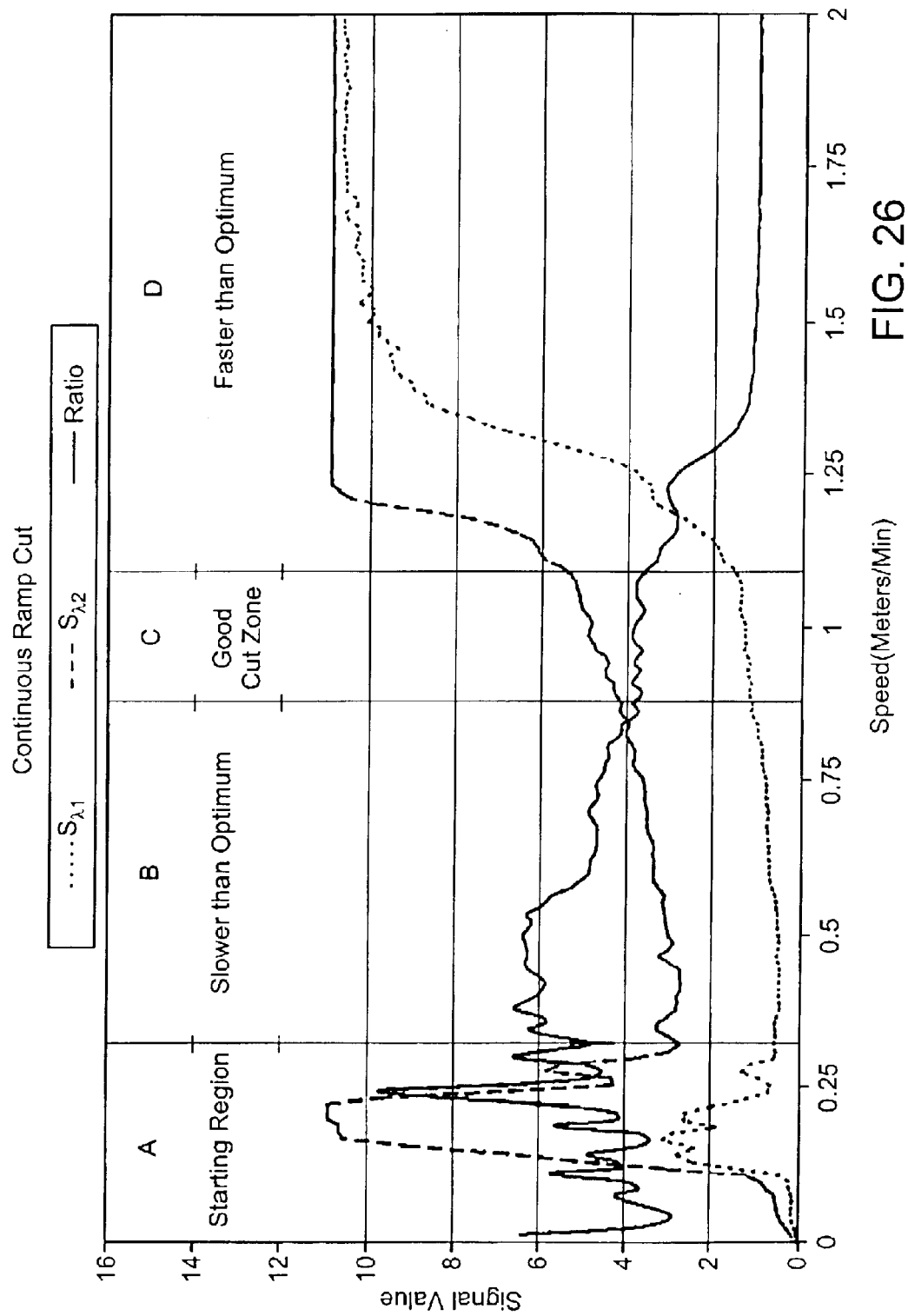
FIG. 26 is a graph of data representative of an embodiment of a material processing system of the present invention.

The exclusive use of the Intensity Ratio to control cut speed, however, can also lead to ambiguous results. FIG. 26 shows a plot of the radiant light intensity signals ($S_{\lambda_1}$ or $S_{\lambda_2}$), as well as the intensity ratio vs. cut speed for a test cut, where the cut speed is varied from 0 to 2 meters/minute. FIG. 6 shows four cut conditions that occur as the test cut speed changes from 0 to 2 meters/minute. The first region "A" is the starting region, which ranges from 0 to about 0.33 meters/minute. In the starting region the kerf front is almost vertical and emissions are small. The second region "B" is a region where cut speed is slower than optimal. In this embodiment, region B extends from about 0.33 to 0.9 meters/minute. Region B is categorized in that both ($S_{\lambda_1}$ or $S_{\lambda_2}$ are increasing, while the intensity ratio is decreasing because $S_{\lambda_2}$ is increasing faster than $S_{\lambda_1}$. The third region "C" is categorized as a good cut zone region because the cut speed is generally optimal. In this embodiment, the C region extends from about 0.9 to 1.1 meters/minute. The fourth region "D" is a region where the cut speed is faster than optimal and results in a non-penetrating cut. In this embodiment, region D is any cutting speed greater than about 1.1 meters/minute. Region D is categorized in that the intensity ratio is decreasing from the intensity levels in the generally optimized cut zone C, and the absolute values of $S_{\lambda_1}$ and $S_{\lambda_2}$ are increasing. The Intensity Ratio can have the same value on either side of region C at two very different cut speeds, for example, one peak at a low speed and the other at a higher speed. A material processing system in which quality is based on the Intensity Ratio solely would be unable to distinguish between these two different conditions.

The light source monitor 1332 addresses this problem by using a magnitude of at least one of the radiant light intensity signals ($S_{\lambda_1}$ or $S_{\lambda_2}$) along with the Intensity Ratio to determine the cutting quality. For an overcombustion cutting condition, the radiant light intensity signals ($S_{\lambda_1}$ or $S_{\lambda_2}$) both increase in magnitude. Thus, by specifying a threshold for either wavelength ($S_{\lambda_1}$ or $S_{\lambda_2}$) signal, an overcombustion cutting condition can be detected. The condition associated with an overcombustion cut can be detected when the Intensity Ratio is greater than a predetermined upper limit and one of the wavelength ($S_{\lambda_1}$ or $S_{\lambda_2}$) signal exceeds a second predetermined limit. In one embodiment, the magnitude can be a maximum. In another embodiment, the magnitude can be a minimum. In another embodiment, the magnitude can be between the minimum and maximum.

For a non-penetrating cutting condition, the radiant light intensity signals ($S_{\lambda_1}$ or $S_{\lambda_2}$) both increase in magnitude. Thus, by specifying a threshold for the higher wavelength ($S_{\lambda_2}$) signal, a non-penetrating cutting condition can be detected. The condition associated with a non-penetrating cut can be detected when the Intensity Ratio is less than a predetermined lower limit and the either wavelength ($S_{\lambda_2}$) signal increases above a second predetermined limit. In one embodiment, the magnitude can be a maximum. In another embodiment, the magnitude can be a minimum. In another embodiment, the magnitude can be between the minimum and maximum.

Similarly, for very low and very high cutting speeds, the Intensity Ratio calculated for these conditions could be similar, thus masking the character (e.g., whether the cut is penetrating or non-penetrating) of the cut quality. At low cutting speeds, both radiant light intensity signals ($S_{\lambda_1}$ or $S_{\lambda_2}$) are small in value. For high speeds (e.g., above the optimum cutting speed range), both the radiant light intensity signals ($S_{\lambda_1}$ or $S_{\lambda_2}$) increase in value as the laser fails to penetrate the workpiece and instead heats up the workpiece.

It should be noted that intensity ratio vs. cutting speed charts, like the one shown in FIG. 26, should be generated for different workpiece materials and thickness, as well as for different laser systems. The will allow the user to determine the generally optimal cutting range for a given material, with a given thickness, for a given laser system.

Figure 24A:
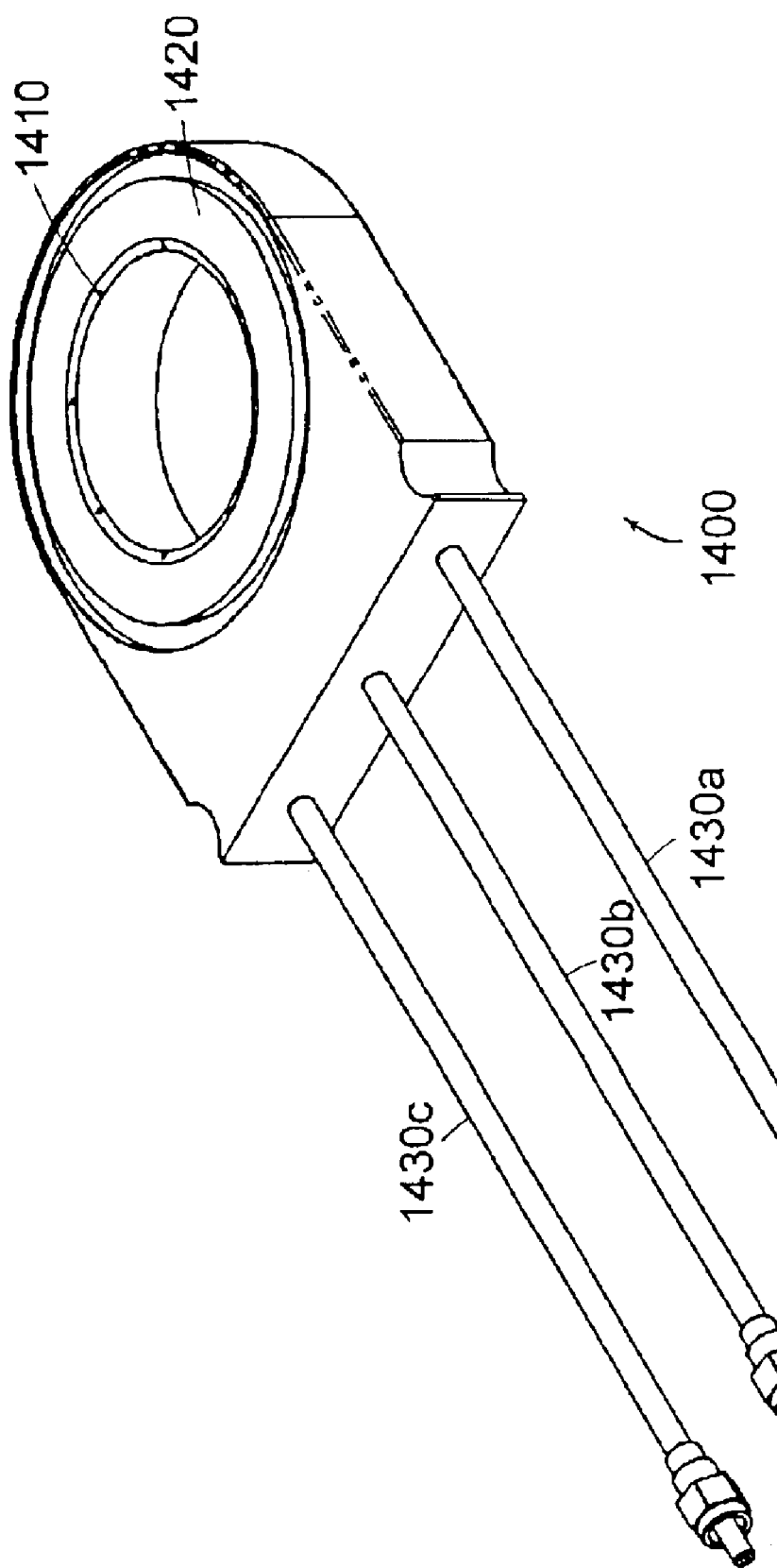
FIG. 24A is a perspective view of an optical receiver of a material processing apparatus for monitoring the light emitted by a workpiece in accordance with an embodiment of the present invention.

In another embodiment, illustrated in FIG. 24A, an optical receiver 1400, having an annular shape is provided for monitoring at least one optical signal emitted from the cut zone of a processed workpiece. In this one embodiment, the receiver 1400 comprises eight ports 1410 that are located equally spaced around the circumference of a ring 1420 of the receiver 1400. The optical signal that passes through each port 1410 is subsequently passed via individual optical fibers (not shown) to each of three fiber optic cables 1430a, 1430b, and 1430c (generally 1430). The portion of the optical signal passed through each port 1410 is divided equally among each cable 1430.

Figure 24B:
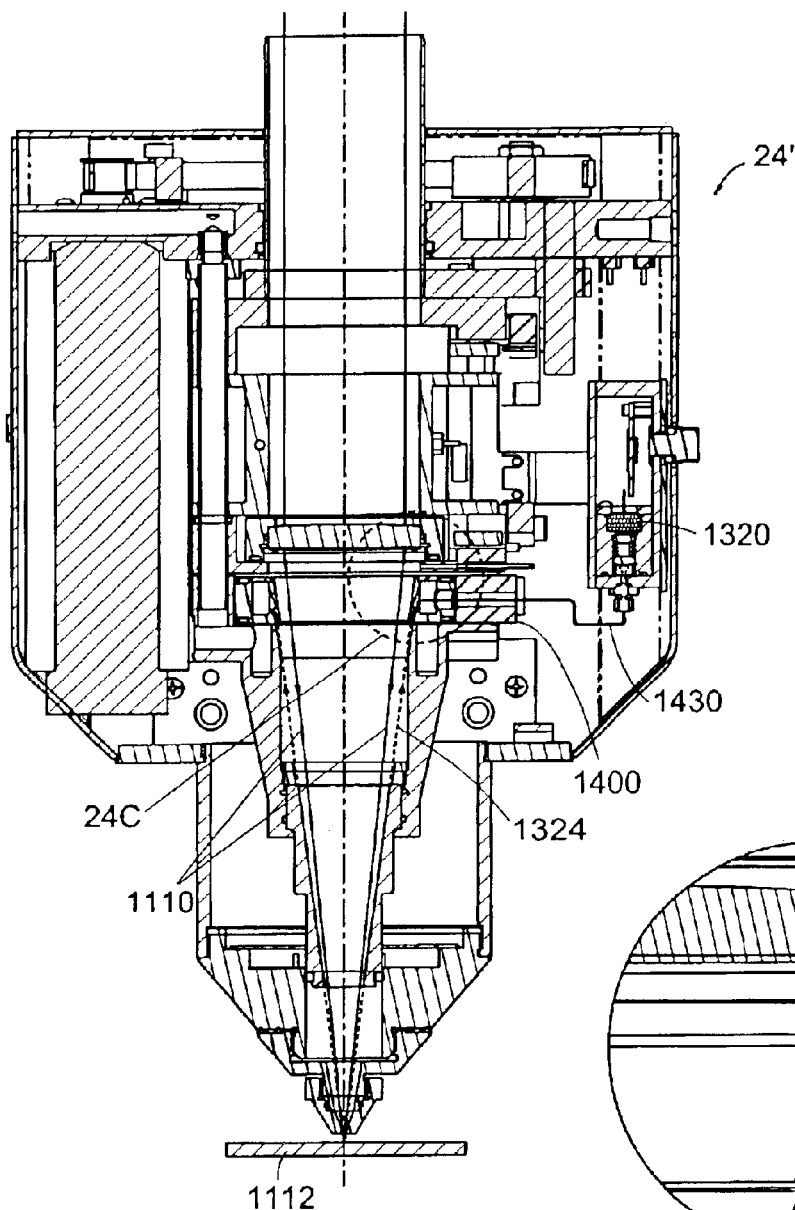
FIG. 24B is a cross-section view of an embodiment of a laser cutting head and an optical receiver of the present invention.
Figure 24C:
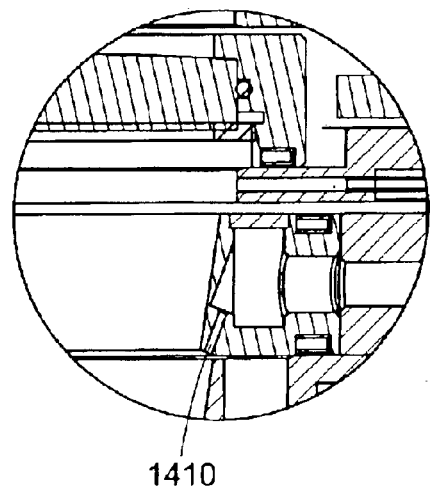
FIG. 24C is a close-up cross-section view of a port in accordance with an embodiment of the present invention.

In this embodiment, the receiver 1400 is located within a laser cutting head 24', as shown in FIGS. 24B and 24C. The cables 1430 (only one cable 1430 is shown for purposes of clarity) are each connected to an individual optical detector 1320. The optical signals 1324 are passed to each optical detector 1320 by each respective cable 1430. The detectors 1320 measure the radiant light intensity of the optical signals 1324 emitted from the workpiece 1112 in response to the material processing stream 1110. The output (i.e., the radiant light intensity in a discrete, narrow spectral band) of each detector 1320 is then passed to a light source monitor, such as the light source monitor 1332 of FIG. 23. In one embodiment, the light source monitor provides an operator with an indication of the quality of the cut produced by the material processing apparatus. In another embodiment, the light source monitor may be an independent system for monitoring the processing quality of a material processing system, such as the system described in co-pending patent application entitled "Process Monitor For Laser and Plasma Materials Processing of Materials" (Serial No. not yet available) filed on Mar. 31, 2003, the disclosure of which is hereby incorporated by reference in its entirety.

Alternative spacing and numbers (e.g., 3 or greater) of ports 1410 and respective optical fibers may be used in other embodiments. However, it is generally desirable to use a sufficient number (e.g., greater than three) of ports 1410 to ensure that the receiver 1400 measures the average light emitted by the workpiece undergoing material processing. When a sufficient number of ports (e.g., greater than three) are used, the determination of cut quality is insensitive, or less sensitive, to the cutting direction.

Figure 25:
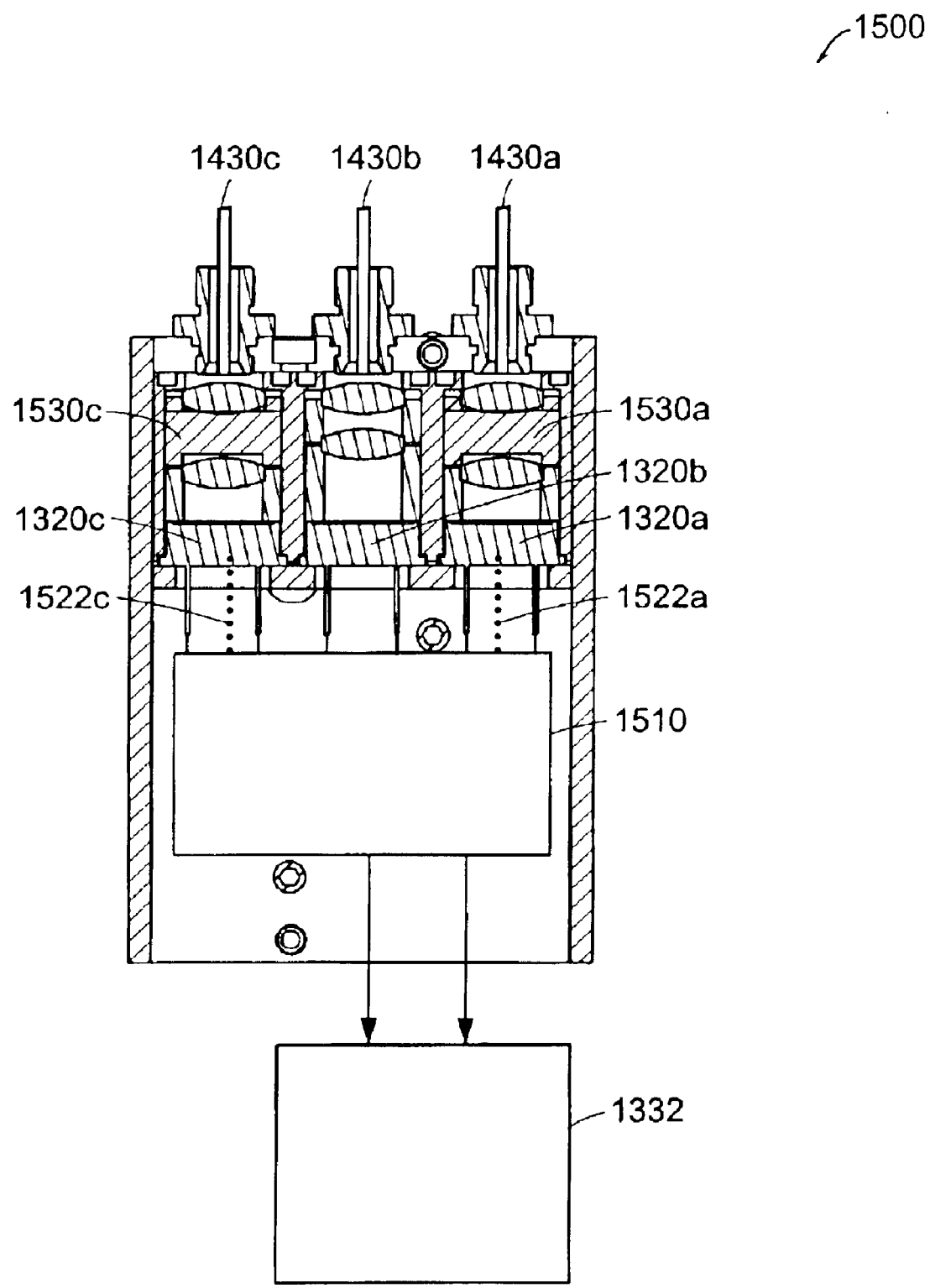
FIG. 25 is an illustration of a detector system for monitoring quality of the processing performed by a material processing apparatus in accordance with an embodiment of the present invention.

In another embodiment, illustrated in FIG. 25, the cables 1430a, 1430b, and 1430c transmit the optical signals to a detector system 1500. The optical signals passing through the cables 1430a and 1430c are subsequently passed through two signal filters 1530a and 1530c, respectively. The filters 1530a and 1530c condition the optical signals passed through the filters so they each represent a narrow spectral band of radiant light intensity as described previously herein. By way of example, the filter 1530a and 1530c are model nos. F10-1050.0-4-0.5 and F10-560.0-4-0.5, sold by CVI Laser Corp., located in Putnam, Conn. The radiant light intensity signals ($S_{\lambda 1}$) passed by filter 1530a represents a narrow band of light at a wavelength of light centered at about 560 nm, but generally between about 450 nm and about 650 nm. The radiant light intensity signals ($S_{\lambda 2}$) passed by filter 1530c represents a narrow band of light at a wavelength of light centered at about 1,050 nm, but generally between about 950 nm and about 1,150 nm.

The radiant light intensity signals ($S_{\lambda 1}$ or $S_{\lambda 2}$) output by the filters 1530a and 1530c pass to detectors 1320a and 1320c, respectively. Detectors 1320a and 1320c convert the radiant light intensity signals ($S_{\lambda 1}$ or $S_{\lambda 2}$) into electrical signals or outputs 1522a and 1522c, respectively. The outputs 1522a and 1522c are subsequently passed to a signal conditioning module 1510. The signal conditioning module 1510, e.g., amplifies the outputs 1522a and 1522c and passes the amplified signals to the light source monitor 1332. The light source monitor 1332 determines the processing quality of a workpiece based upon the outputs 1522a and 1522c. The light source monitor 1322 calculates a ratio (i.e., the Intensity Ratio of Eqn. 3) of the output 1522a relative to the output 1522c. Typically, the ratio is calculated in real-time or at discrete predetermined points in time to create an indication of processing quality as a function of time. The light source monitor 1332 also extracts a magnitude, for example, the magnitude of the outputs 1522a or 1522c at the same predetermined points in time as the ratio is calculated. In one embodiment, the magnitude can be a maximum. In another embodiment, the magnitude can be a minimum. In another embodiment, the magnitude can be between the minimum and maximum.

The light source monitor 1332 then compares the ratio and the magnitude with a lookup table stored within the light source monitor 1332 to determine the quality of the material processing being performed at the predetermined points in time. In one embodiment, the lookup table is a collection of experimental data that is predetermined by the manufacturer of the system or by an operator of the system. The table can include data for different workpiece materials (e.g., steel, aluminum, and titanium), different material thickness, different cutting rates, different cutting accelerations, and different cutting profiles (e.g., curves or straight lines). An example of data for a straight line cut of mild steel that could be included in a lookup table is provided below:

| Material Thickness | Target Ratio | Max Magnitude $S_1$ |
|---|---|---|
| ¼" | 2.8 | 4 |
| ½ | 4 | 3 |
| ¾ | 5 | 2.5 |

By way of example, the measure of the quality of the material processing being performed at a specific point in time can be a value that indicates, e.g., whether the material processing system is operating in a condition that results in overcombustion cutting conditions, clean (normal) cutting conditions or undercombustion cutting conditions of the workpiece.

FIG. 26 illustrates an example of data acquired by an embodiment of a material processing apparatus used to cut a 12.7 mm thick steel workpiece using a laser system. The graph depicts two filtered signals 1530a and 1530c as $S_{\lambda 2}$ and $S_{\lambda 1}$. FIG. 26 also shows a ratio of the $S_{\lambda 1}$ and $S_{\lambda 2}$ signals. The $S_{\lambda 2}$ data represents the filtered radiant light intensity measured by a detector in a narrow spectral band that has a center wavelength equivalent to the wavelength of light, which in one embodiment can be a wavelength of about 675 nm. The $S_{\lambda 1}$ data represents the radiant light intensity measured by a detector in a narrow spectral band that has a center wavelength equivalent to the wavelength of light, which in one embodiment can be a wavelength of about 530 nm. In other embodiments, the optical signal can be filtered between a range of about 450 nm and about 1150 nm. The ratio data represents the ratio of the $S_{\lambda 2}$ data and the $S_{\lambda 1}$ data (i.e., a representation of the Intensity Ratio as described herein).

It should be noted that any pair of spectral bands can be used based upon the material to be processed, the thickness of the material, and the equipment to be used. Typically, the spectral band can be any range between about 300–2,000 nm.

The X-axis of the graph represents the speed of the cutting process, where cut speed increases from 0 to 2 meters per minute. Also indicated in the graph is region C, the good cut zone (e.g., minimal dross or desirable kerf size). The graph also illustrates a slower than optimal condition, region B, at a cut speed ranging from about 0.33 to 0.9 meters/minute. Region D is a faster than optimal cutting condition, where the cut speed is greater than about 1.1 meters/minute. Finally, the graph also illustrates a starting region, region A, which ranges from about 0 to about 0.33 meters/minute.

By varying the speed of the cut, this allows for experimental determination of a good cutting region, an overcombustion region, and a non-penetration cutting region. In addition to a predetermined lookup table, the conditions can be determined automatically by a test cut as described in FIG. 6 and an algorithm can be used to identify the optimal region for cutting.

The material processing system 100 of FIG. 21 can further include elements as previously shown in FIG. 2 to result in a centralized control architecture for a laser cutting system, in which the "intelligence" of the system is integrated into a single controller. The centralized control architecture eliminates redundant hardware and software and integrates the entire system, thereby improving performance and reducing cycle time. The laser cutting system including the centralized control architecture, will be referred to herein as a closely-coupled laser cutting system or simply a laser cutting system.

Figure 27:
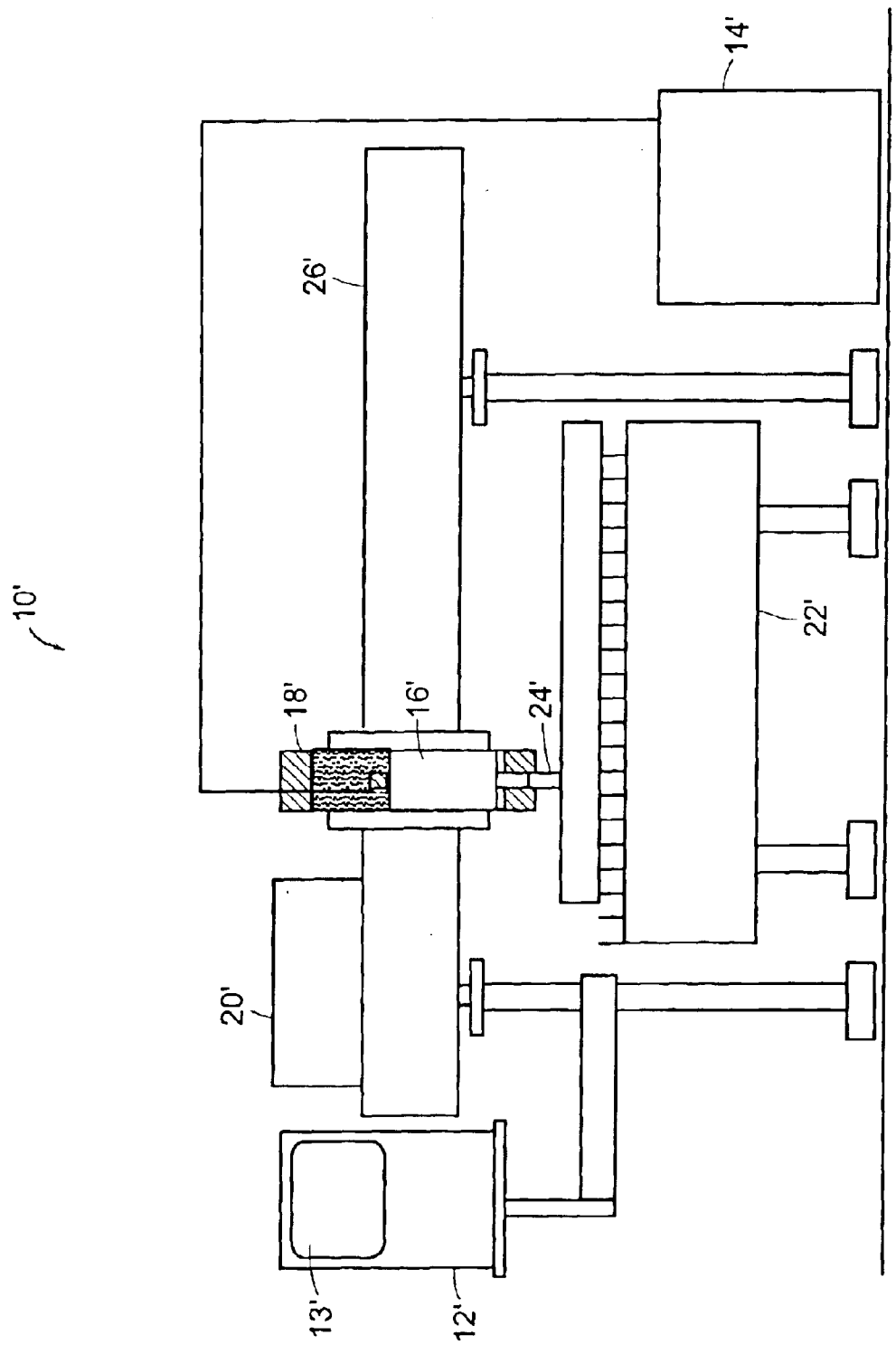
FIG. 27 is a schematic diagram of a closely-coupled laser cutting system according to one embodiment of the present invention.

Referring to FIG. 27, a closely-coupled laser cutting system 10' includes a computerized numeric controller (CNC) 12', a display screen 13', a material processing stream source which, in this embodiment, is a light source 14', an automatic process controller 16', a laser height controller 18', a drive system 20', a cutting table 22', and a laser processing head 24'.

In general, the CNC 12' controls the motion of the laser processing head 24' over the cutting table 22' and the timing of the cutting process as the process relates to the motion. In the present invention, the CNC 12' is capable of controlling, not only the motion of the laser processing head 24', but also the operation of the other components of the laser cutting system 10', as well as other cutting processes. The various components of the laser cutting system 10' can be controlled by the CNC 12' concurrently.

The CNC 12' interfaces with the user. The CNC 12' allows the user to select or provide certain process parameters. The CNC 12' generates other process parameters necessary to operate the laser cutting system 10' based on the user selection and/or input. A cut program for a laser cutting system, similar to the cut program 600 as previous shown in FIG. 16 for a plasma arc system, provides part specific information for laser head motion and cutting laser operation. The CNC 12' commands the light source 14', the automatic process controller 16', the laser head height controller 18' and the drive system 20' to operate. The CNC 12' also monitors certain process conditions to determine whether the laser cutting system 10' is operating properly. Based on the monitored information, the CNC 12' adjusts the operation of the other components of the laser cutting system 10', if necessary. Details of the CNC 12' mirror the description previously given in greater detail in FIGS. 3, 4, 5A–5B, and 15–20.

The material processing stream source 14' is a light source to generate a laser beam. In the present invention, all intelligence and adjustment controls for configuring the cut process typically provided in a light source have been migrated into the CNC 12' and/or the automatic process controller 16'. Upon receiving an appropriate command signal from the CNC, the light source 14' transforms an input signal into an output signal sufficient to generate and maintain a laser beam. Several components of the light source 14', including the output generated by the light source 14' are controlled by the CNC 12' through a feedback mechanism. In one embodiment, the light source 14' is a laser power source, model no. RF050, sold by Rofin-Sinar Laser GmbH, located in Hamburg, Germany.

The automatic process controller 16' is designed to replace the manual gas flow controls that are normally located at the light source and/or a gas control module. The automatic process controller 16' includes proportional flow control valves to control the flow rate of the assist gas and the shield gas. The automatic process controller 16' also includes pressure transducers for measuring the pressure of the assist gas and the shield gas. This pressure information is provided to the CNC 12', which in turn adjusts the proportional flow control valves if necessary to change the flow rates. The intelligence of the automatic process controller 16' is also located at the CNC 12'. The automatic process controller 16' has been described in greater detail in FIGS. 8–12.

The laser height controller 18' controls the standoff between the laser processing head 24' and the work piece. Unlike a conventional height controller, however, the intelligence of the laser height controller 18' is migrated into the CNC 12'. The laser height controller 18' is controlled directly from the CNC 12' as a separate servo axis in a manner similar to the drive system 20' in a conventional plasma arc system. The CNC 12' provides a command signal to the laser height controller 18' to adjust the standoff, based on an output measured at the laser processing head 24'. The laser height controller 18' is similar to the torch height controller 18' described in greater detail in FIGS. 13 and 14. In one embodiment, the output signal generated by the laser height controller 18' is an analog voltage signal that is proportional to the distance between the laser cutting head and the work piece. The output signal generated by the laser height controller, alternatively, may be a digital command signal or an analog current signal.

The drive system 20' receives command signals from the CNC to move the laser processing head 24' in an x or y direction over the cutting table 22'. The cutting table 22' supports a work piece. The laser processing head 24' is mounted to the laser height controller 18' which is mounted to the gantry 26'. The drive system 20' moves the gantry 26' relative to the table 22' and moves the laser processing head 24' along the gantry 26'. The information about the position of the laser processing head 24' is provided to the CNC 12'. Thus, the CNC 12' allows interactive response and maintains an accurate cut path. Operation of the drive system 20' and the cutting table 22' do not constitute an inventive aspect of the present invention and are well known to those skilled in the art.

The CNC 12', just like the CNC 12 described in FIGS. 1–19, can receive outputs from various components of the laser cutting system 10', such as the light source 14', automatic process controller 16', laser height controller 18', drive system 20', cutting table 22' and a laser processing head 24'. The CNC 12' can then send an input to the component that originally sent the output (i.e., a first auxiliary device) or any other component (i.e., a second auxiliary device) to change the output of the component that originally sent the output, or any other component in communication with the CNC 12'.

While the invention has been particularly shown and described with reference to specific preferred embodiments, it should be understood by those skilled in the art that various changes in form and detail may be made therein without departing from the spirit and scope of the invention as defined by the appended claims. For example, the centralized control architecture described herein can be useful in operating other metal processing systems, such as a plasma arc welding system.

What is claimed is:

1. A method of controlling a laser beam system, the method comprising the steps of:
   a) directing an incident laser beam onto a workpiece;
   b) providing at least one command signal from a controller to at least one auxiliary device to control an output parameter generated by said at least one auxiliary device, wherein at least one auxiliary device is one of an energy source and an automatic process controller;
   c) detecting said output parameter generated by at least one auxiliary device and adjusting said at least one command signal provided to at least one auxiliary device based on said detected output;
      c1) detecting at least one signal emitted from said workpiece in response to said incident laser beam at an optical detector, said detector generating two outputs based on said at least one signal; and
      c2) adjusting at least one command signal from said controller to at least one auxiliary device to control said at least one signal emitted from said workpiece, said at least one command signal provided by said controller is based upon a ratio of said two outputs and a magnitude of at least one of said two outputs.

2. The method of claim 1 wherein the step of providing at least one command signal further comprises the steps of:
   b1) determining a location in a lookup table based on said ratio and said magnitude of at least one of said two outputs; and
   b2) providing a command signal based on said lookup table based upon said location in said lookup table.

3. The method of claim 1 wherein said at least one command signal is a laser beam command signal and said auxiliary device is said energy source for controlling said laser beam.

4. The method of claim 1 wherein said at least one command signal is a gas flow command signal and said at least one auxiliary device is said automatic process controller for controlling said gas flow supplied by said automatic process controller.

5. The method of claim 1 wherein said at least one auxiliary device is an automatic process controller for controlling a gas flow to said laser beam system and step c) comprises detecting pressure of a gas exiting said automatic process controller and adjusting said command signal provided to said automatic process controller based on said pressure.

6. A method of controlling a laser beam system, the method comprising the steps of:
   a) directing an incident laser beam onto a workpiece;
   b) providing at least one command signal from a controller to at least one auxiliary device to control an output parameter generated by said at least one auxiliary device, wherein said at least one auxiliary device comprises a first auxiliary device that is an automatic process controller and a second auxiliary device that is an energy source; and
   c) detecting a pressure of an outlet gas exiting said automated process controller and adjusting said command signal provided to said energy source for controlling laser beam energy based on said pressure of said outlet gas.

7. The method of claim 6 wherein step c) comprises detecting a feedback signal generated by said energy source indicative of an energy beam of said laser beam system and adjusting said command signal provided to said automatic process controller for controlling a gas flow based on said feedback signal.

8. The method of claim 7 wherein step of detecting a feedback signal comprises detecting at least one signal emitted from said workpiece in response to said incident laser beam at an optical detector, said detector generating two outputs based on said at least one signal.

9. A method of controlling a laser beam system, the method comprising the steps of:
   a) directing an incident laser beam onto a workpiece;
   b) providing at least one command signal from a controller to at least one auxiliary device to control an output parameter generated by said at least one auxiliary device, wherein said at least one auxiliary device comprises a first auxiliary device that is an automatic process controller and a second auxiliary device that is a laser height controller; and
   c) detecting a feedback signal generated by said energy source indicative of an energy signal of said laser beam system and adjusting said command signal provided to said laser height control for controlling a standoff based on said feedback signal.

10. The method of claim 9 wherein said step of detecting a feedback signal comprises detecting at least one signal emitted from said workpiece in response to said incident laser beam at an optical detector, said detector generating two outputs based on said at least one signal.

11. The method of claim 1 wherein said magnitude of said at least one of said two outputs is a maximum value.

12. The method of claim 1 wherein said detector comprises at least two detector elements.

13. The method of claim 1 wherein said two outputs comprise a first spectral band of light and a second spectral band of light.

14. The method of claim 13 wherein said first spectral band of light has a lower band of wavelengths than said second spectral band of light.

15. The method of claim 13 wherein said first spectral band of light is a spectral band between about 450 nm and about 650 nm.

16. The method of claim 13 wherein said second spectral band of light is a spectral band between about 950 nm and about 1,150 nm.

17. The method of claim 1 further comprising the steps of:
   d) inputting a first group of process parameters into a controller; and generating a second group of process parameters based on said first group of parameters.

18. The method of claim 1 wherein said laser beam is directed onto a workpiece by a cutting head, said cutting head comprises a plenum, a nozzle, a focusing lens, and an optical receiver, and the detector.

19. The method of claim 18 wherein said optical receiver comprises at least one port for conveying said at least one signal emitted from said workpiece to a cable, said cable conveying said at least one signal emitted from said workpiece to said detector.

20. An apparatus for controlling a laser beam system, said apparatus comprising:
   a light source that directs an incident laser beam onto a workpiece;
   a controller in communication with said light source that provides at least one command signal to at least one auxiliary device to control an output parameter generated by said at least one auxiliary device, wherein at least one auxiliary device is one of an energy source and an automatic process controller; and
   a detection module for detecting said output parameter generated by at least one auxiliary device for adjusting said at least one command signal provided to at least one auxiliary device based on said detected output, wherein the detection module comprises an optical detector for measuring at least one signal emitted from said workpiece in response to said incident laser beam, said optical detector generating two outputs based on said at least one signal, and
   said controller is in communication with said optical detector, and said controller passes at least one command signal from said controller to at least one auxiliary device to control said at least one signal emitted from said workpiece, said at least one command signal provided by said controller is based upon a ratio of said two outputs and a magnitude of at least one of said two outputs.

21. The apparatus of claim 20 wherein said controller controls said laser beam system by:
   determining a location in a lookup table based on said ratio and said magnitude of at least one of said two outputs; and
   providing a command signal based on said lookup table based upon said location in said lookup table.

22. The apparatus of claim 20 wherein said light source comprises a cutting head, said cutting head comprises a plenum, a nozzle, a focusing lens, and an optical receiver.

23. The apparatus of claim 22 wherein said optical receiver comprises at least one port for conveying said at least one signal emitted from said workpiece to a cable, said cable conveying said at least one signal emitted from said workpiece to said detector.

24. The apparatus of claim 23 wherein said optical receiver comprises an annular ring for locating said at least one port in a laser cutting head.

25. The apparatus of claim 20 wherein said at least one command signal is a laser beam command signal and said auxiliary device is said energy source for controlling said laser beam.

26. The apparatus of claim 20 wherein said at least one command signal is a gas flow command signal and said at least one auxiliary device is said automatic process controller for controlling said gas flow supplied by said automatic process controller.

27. The apparatus of claim 20 wherein said at least one auxiliary device is an automatic process controller for controlling a gas flow to said laser beam system and said detection module detects pressure of a gas exiting said automatic process controller.

28. An apparatus for controlling a laser beam system, said apparatus comprising:
   a light source that directs an incident laser beam onto a workpiece;
   a controller in communication with said light source that provides at least one command signal to at least one auxiliary device to control an output parameter generated by said at least one auxiliary device, wherein said first auxiliary device is an automatic process controller and said second auxiliary device is an energy source; and
   a detection module that detects a pressure of an outlet gas exiting said automated process controller and adjusts said command signal provided to said energy source for controlling laser beam energy based on said pressure of said outlet gas.

29. The apparatus of claim 28 wherein said detection module detects a feedback signal generated by said energy source indicative of an energy beam of said laser beam system and adjusts said command signal provided to said automatic process controller for controlling a gas flow based on said feedback signal.

30. The apparatus of claim 29 wherein said feedback signal is at least one signal emitted from said workpiece in response to said incident laser beam, said detection module generates two outputs based on said at least one signal.

31. An apparatus for controlling a laser beam system, said apparatus comprising:
   a light source that directs an incident laser beam onto a workpiece;
   a controller in communication with said light source that provides at least one command signal to at least one auxiliary device to control an output parameter generated by said at least one auxiliary device, wherein said first auxiliary device is an energy source and said second auxiliary device is a laser height controller; and
   a detection module that detects a feedback signal generated by said energy source indicative of an energy signal of said laser beam system and adjusts said command signal provided to said laser height controller for controlling a standoff based on said feedback signal.

32. The apparatus of claim 31 wherein said feedback signal is at least one signal emitted from said workpiece in response to said incident laser beam, said detection module generates two outputs based on said at least one signal.

33. The apparatus of claim 20 wherein said magnitude of said at least one of said two outputs is a maximum value.

34. The apparatus of claim 20 wherein said detector comprises at least two detector elements.

35. The apparatus of claim 20 wherein said two outputs comprise a first spectral band of light and a second spectral band of light.

36. The apparatus of claim 35 wherein said first spectral band of light has a lower band of wavelengths than said second spectral band of light.

37. The apparatus of claim 35 wherein said first spectral band of light is a spectral band between about 450 nm and about 650 nm.

38. The apparatus of claim 35 wherein said second spectral band of light is a spectral band between about 950 nm and about 1150 nm.

39. A method of controlling a material processing system, the method comprising the steps of:
   directing a material processing stream onto a workpiece;
   providing at least one command signal from a controller to at least one auxiliary device to control an output parameter generated by said at least one auxiliary device, wherein at least one auxiliary device is one of a material processing stream source and an automatic process controller; and detecting said output parameter generated by at least one auxiliary device and adjusting said at least one command signal provided to at least one auxiliary device based on said detected output, detecting at least one signal emitted from said workpiece in response to said material processing stream at an optical detector, said detector generating two outputs based on said at least one signal; and adjusting at least one command signal from said controller to at least one auxiliary device to control said at least one signal emitted from said workpiece, said at least one command signal provided by said controller is based upon a ratio of said two outputs and a magnitude of at least one of said two outputs.

40. The method of claim 39 wherein the step of providing at least one command signal further comprises the steps of:

determining a location in a lookup table based on said ratio and said magnitude of at least one of said two outputs; and providing a command signal based on said lookup table based upon said location in said lookup table.

41. The method of claim 39 wherein said material processing stream source is a laser system, and said material processing stream is a laser beam.

42. The method of claim 39 wherein said material processing stream source is a plasma arc system and said material processing stream is a plasma arc.

* * * * *